(12) United States Patent
Rao et al.

(10) Patent No.: US 7,978,714 B2
(45) Date of Patent: Jul. 12, 2011

(54) METHODS AND SYSTEMS FOR SECURING ACCESS TO PRIVATE NETWORKS USING ENCRYPTION AND AUTHENTICATION TECHNOLOGY BUILT IN TO PERIPHERAL DEVICES

(75) Inventors: Goutham P. Rao, San Jose, CA (US); Robert A. Rodriguez, San Jose, CA (US); Eric R. Brueggemann, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 887 days.

(21) Appl. No.: 11/161,090

(22) Filed: Jul. 22, 2005

(65) Prior Publication Data
US 2006/0029062 A1 Feb. 9, 2006

Related U.S. Application Data

(60) Provisional application No. 60/590,837, filed on Jul. 23, 2004, provisional application No. 60/601,431, filed on Aug. 13, 2004, provisional application No. 60/607,420, filed on Sep. 3, 2004, provisional application No. 60/634,379, filed on Dec. 7, 2004.

(51) Int. Cl.
*H04L 12/56* (2006.01)
(52) U.S. Cl. ..................................................... 370/401
(58) Field of Classification Search .................. 370/351, 370/389, 392, 400, 401, 409; 726/2, 3, 11–12, 726/14–15, 21
See application file for complete search history.

(56) References Cited

U.S. PATENT DOCUMENTS

| | | | |
|---|---|---|---|
| 5,623,492 | A | 4/1997 | Teraslinna |
| 5,812,668 | A | 9/1998 | Weber |
| 5,819,020 | A | 10/1998 | Beeler, Jr. |
| 5,835,726 | A | 11/1998 | Shwed et al. |
| 5,850,446 | A | 12/1998 | Berger et al. |
| 5,889,863 | A | 3/1999 | Weber |
| 5,931,917 | A | 8/1999 | Nguyen et al. |
| 5,943,424 | A | 8/1999 | Berger et al. |
| 5,956,483 | A | 9/1999 | Grate et al. |
| 5,958,016 | A | 9/1999 | Chang et al. |

(Continued)

FOREIGN PATENT DOCUMENTS

CN 1394042 1/2003

(Continued)

OTHER PUBLICATIONS

International Search Report for PCT/US2005/026300, Mailing date: Dec. 16, 2005. 3 pages.

(Continued)

*Primary Examiner* — Derrick W Ferris
*Assistant Examiner* — Omar Ghowrwal
(74) *Attorney, Agent, or Firm* — Foley & Lardner LLP; Christopher McKenna

(57) ABSTRACT

A method for routing packets from a peripheral device to a Virtual Private Network (VPN) gateway includes the step of implementing, by a peripheral device, a change to a routing table. The peripheral device receives an outbound packet. The peripheral device transmits information about the outbound packet to a VPN client application. The peripheral device modifies address information on the outbound packet with address information associated with the VPN client application. The peripheral device transmits the modified outbound packet to the VPN client application.

31 Claims, 10 Drawing Sheets

U.S. PATENT DOCUMENTS

| | | | |
|---|---|---|---|
| 5,978,840 A | 11/1999 | Nguyen et al. | |
| 5,983,208 A | 11/1999 | Haller et al. | |
| 5,987,132 A | 11/1999 | Rowney | |
| 5,996,076 A | 11/1999 | Rowney et al. | |
| 5,999,525 A | 12/1999 | Krishnaswamy et al. | |
| 6,002,767 A | 12/1999 | Kramer | |
| 6,023,724 A | 2/2000 | Bhatia et al. | |
| 6,026,379 A | 2/2000 | Haller et al. | |
| 6,026,440 A | 2/2000 | Shrader et al. | |
| 6,058,250 A | 5/2000 | Harwood et al. | |
| 6,061,796 A | 5/2000 | Chen et al. | |
| 6,067,569 A | 5/2000 | Khaki et al. | |
| 6,072,870 A | 6/2000 | Nguyen et al. | |
| 6,101,543 A | 8/2000 | Alden et al. | |
| 6,112,085 A | 8/2000 | Garner et al. | |
| 6,119,105 A | 9/2000 | Williams | |
| 6,131,120 A | 10/2000 | Reid | |
| 6,163,772 A | 12/2000 | Kramer et al. | |
| 6,173,325 B1 | 1/2001 | Kukreja | |
| 6,178,409 B1 | 1/2001 | Weber et al. | |
| 6,182,139 B1 | 1/2001 | Brendel | |
| 6,219,669 B1 | 4/2001 | Haff et al. | |
| 6,236,652 B1 | 5/2001 | Preston et al. | |
| 6,253,027 B1 | 6/2001 | Weber et al. | |
| 6,253,327 B1 | 6/2001 | Zhang et al. | |
| 6,272,556 B1 | 8/2001 | Gish | |
| 6,282,172 B1 | 8/2001 | Robles et al. | |
| 6,289,382 B1 | 9/2001 | Bowman-Amuah | |
| 6,304,915 B1 | 10/2001 | Nguyen et al. | |
| 6,308,273 B1 | 10/2001 | Goertzel et al. | |
| 6,321,337 B1 | 11/2001 | Reshef et al. | |
| 6,324,525 B1 | 11/2001 | Kramer et al. | |
| 6,327,242 B1 | 12/2001 | Amicangioli et al. | |
| 6,332,163 B1 | 12/2001 | Bowman-Amuah | |
| 6,333,931 B1 | 12/2001 | LaPier et al. | |
| 6,339,832 B1 | 1/2002 | Bowman-Amuah | |
| 6,345,239 B1 | 2/2002 | Bowman-Amuah | |
| 6,363,363 B1 | 3/2002 | Haller et al. | |
| 6,373,950 B1 | 4/2002 | Rowney | |
| 6,412,000 B1 | 6/2002 | Riddle et al. | |
| 6,427,132 B1 | 7/2002 | Bowman-Amuah | |
| 6,434,568 B1 | 8/2002 | Bowman-Amuah | |
| 6,434,618 B1 | 8/2002 | Cohen et al. | |
| 6,434,628 B1 | 8/2002 | Bowman-Amuah | |
| 6,438,127 B1 | 8/2002 | Le Goff et al. | |
| 6,438,594 B1 | 8/2002 | Bowman-Amuah | |
| 6,442,571 B1 | 8/2002 | Haff et al. | |
| 6,442,748 B1 | 8/2002 | Bowman-Amuah | |
| 6,452,915 B1 | 9/2002 | Jorgensen | |
| 6,452,923 B1 | 9/2002 | Gerszberg et al. | |
| 6,473,794 B1 | 10/2002 | Guheen et al. | |
| 6,477,580 B1 | 11/2002 | Bowman-Amuah | |
| 6,477,665 B1 | 11/2002 | Bowman-Amuah | |
| 6,484,206 B2 | 11/2002 | Crump et al. | |
| 6,496,481 B1 | 12/2002 | Wu et al. | |
| 6,496,776 B1 | 12/2002 | Blumberg et al. | |
| 6,496,850 B1 | 12/2002 | Bowman-Amuah | |
| 6,502,102 B1 | 12/2002 | Haswell et al. | |
| 6,502,213 B1 | 12/2002 | Bowman-Amuah | |
| 6,519,571 B1 | 2/2003 | Guheen et al. | |
| 6,523,027 B1 | 2/2003 | Underwood | |
| 6,529,909 B1 | 3/2003 | Bowman-Amuah | |
| 6,529,948 B1 | 3/2003 | Bowman-Amuah | |
| 6,536,037 B1 | 3/2003 | Guheen et al. | |
| 6,539,396 B1 | 3/2003 | Bowman-Amuah | |
| 6,549,949 B1 | 4/2003 | Bowman-Amuah | |
| 6,550,057 B1 | 4/2003 | Bowman-Amuah | |
| 6,553,377 B1 | 4/2003 | Eschelbeck et al. | |
| 6,571,282 B1 | 5/2003 | Bowman-Amuah | |
| 6,574,688 B1 | 6/2003 | Dale et al. | |
| 6,578,068 B1 | 6/2003 | Bowman-Amuah | |
| 6,584,569 B2 | 6/2003 | Reshef et al. | |
| 6,590,588 B2 | 7/2003 | Lincke et al. | |
| 6,594,690 B2 | 7/2003 | Cantwell | |
| 6,601,192 B1 | 7/2003 | Bowman-Amuah | |
| 6,601,233 B1 | 7/2003 | Underwood | |
| 6,601,234 B1 | 7/2003 | Bowman-Amuah | |
| 6,606,660 B1 | 8/2003 | Bowman-Amuah | |
| 6,606,744 B1 | 8/2003 | Mikurak | |
| 6,609,128 B1 | 8/2003 | Underwood | |
| 6,611,522 B1 | 8/2003 | Zheng et al. | |
| 6,611,822 B1 | 8/2003 | Beams et al. | |
| 6,611,867 B1 | 8/2003 | Bowman-Amuah | |
| 6,614,800 B1 | 9/2003 | Genty et al. | |
| 6,615,166 B1 | 9/2003 | Guheen et al. | |
| 6,615,199 B1 | 9/2003 | Bowman-Amuah | |
| 6,615,253 B1 | 9/2003 | Bowman-Amuah | |
| 6,618,359 B1 | 9/2003 | Chen et al. | |
| 6,633,878 B1 | 10/2003 | Underwood | |
| 6,636,242 B2 | 10/2003 | Bowman-Amuah | |
| 6,640,238 B1 | 10/2003 | Bowman-Amuah | |
| 6,640,240 B1 | 10/2003 | Hoffman et al. | |
| 6,640,244 B1 | 10/2003 | Bowman-Amuah | |
| 6,640,248 B1 | 10/2003 | Jorgensen | |
| 6,640,249 B1 | 10/2003 | Bowman-Amuah | |
| 6,662,221 B1 | 12/2003 | Gonda et al. | |
| 6,671,818 B1 | 12/2003 | Mikurak | |
| 6,691,227 B1 | 2/2004 | Neves et al. | |
| 6,697,824 B1 | 2/2004 | Bowman-Amuah | |
| 6,697,844 B1 | 2/2004 | Chan et al. | |
| 6,700,902 B1 | 3/2004 | Meyer | |
| 6,701,514 B1 | 3/2004 | Haswell et al. | |
| 6,704,873 B1 | 3/2004 | Underwood | |
| 6,715,145 B1 | 3/2004 | Bowman-Amuah | |
| 6,718,535 B1 | 4/2004 | Underwood | |
| 6,721,713 B1 | 4/2004 | Guheen et al. | |
| 6,728,787 B1 | 4/2004 | Leigh | |
| 6,732,269 B1 | 5/2004 | Baskey et al. | |
| 6,732,314 B1 | 5/2004 | Borella et al. | |
| 6,735,601 B1 | 5/2004 | Subrahmanyam | |
| 6,735,691 B1 | 5/2004 | Capps et al. | |
| 6,742,015 B1 | 5/2004 | Bowman-Amuah | |
| 6,744,774 B2 * | 6/2004 | Sharma | 370/401 |
| 6,760,748 B1 | 7/2004 | Hakim | |
| 6,766,373 B1 | 7/2004 | Beadle et al. | |
| 6,792,615 B1 | 9/2004 | Rowe et al. | |
| 6,826,627 B2 | 11/2004 | Sjollema et al. | |
| 6,831,898 B1 | 12/2004 | Edsall et al. | |
| 6,842,906 B1 | 1/2005 | Bowman-Amuah | |
| 6,850,252 B1 | 2/2005 | Hoffberg | |
| 6,870,921 B1 | 3/2005 | Elsey et al. | |
| 6,873,988 B2 | 3/2005 | Herrmann et al. | |
| 6,880,086 B2 | 4/2005 | Kidder et al. | |
| 6,894,981 B1 | 5/2005 | Coile et al. | |
| 6,904,449 B1 | 6/2005 | Quinones | |
| 6,907,546 B1 | 6/2005 | Haswell et al. | |
| 6,918,113 B2 | 7/2005 | Patel et al. | |
| 6,920,502 B2 | 7/2005 | Araujo et al. | |
| 6,944,279 B2 | 9/2005 | Elsey et al. | |
| 6,954,736 B2 | 10/2005 | Menninger et al. | |
| 6,954,877 B2 | 10/2005 | Earl et al. | |
| 6,957,186 B1 | 10/2005 | Guheen et al. | |
| 6,980,962 B1 | 12/2005 | Arganbright et al. | |
| 6,990,480 B1 | 1/2006 | Burt | |
| 6,996,628 B2 | 2/2006 | Keane et al. | |
| 6,996,631 B1 | 2/2006 | Aiken, Jr. et al. | |
| 7,000,012 B2 | 2/2006 | Moore et al. | |
| 7,010,300 B1 | 3/2006 | Jones et al. | |
| 7,013,290 B2 | 3/2006 | Ananian | |
| 7,023,979 B1 | 4/2006 | Wu et al. | |
| 7,026,954 B2 | 4/2006 | Slemmer et al. | |
| 7,028,333 B2 | 4/2006 | Tuomenoksa et al. | |
| 7,028,334 B2 | 4/2006 | Tuomenoksa | |
| 7,031,314 B2 | 4/2006 | Craig et al. | |
| 7,036,142 B1 | 4/2006 | Zhang et al. | |
| 7,039,606 B2 | 5/2006 | Hoffman et al. | |
| 7,039,708 B1 | 5/2006 | Knobl et al. | |
| 7,042,879 B2 | 5/2006 | Eschbach et al. | |
| 7,043,529 B1 | 5/2006 | Simonoff | |
| 7,047,279 B1 | 5/2006 | Beams et al. | |
| 7,047,424 B2 | 5/2006 | Bendinelli et al. | |
| 7,054,837 B2 | 5/2006 | Hoffman et al. | |
| 7,054,944 B2 | 5/2006 | Tang et al. | |
| 7,072,665 B1 | 7/2006 | Blumberg et al. | |
| 7,072,843 B2 | 7/2006 | Menninger et al. | |
| 7,080,041 B2 | 7/2006 | Nagel | |
| 7,085,854 B2 | 8/2006 | Keane et al. | |

| | | | | | |
|---|---|---|---|---|---|
| 7,092,370 B2 | 8/2006 | Jiang et al. | 2002/0199007 A1 | 12/2002 | Clayton et al. |
| 7,096,009 B2 | 8/2006 | Mousseau et al. | 2003/0009538 A1 | 1/2003 | Shah et al. |
| 7,100,195 B1 | 8/2006 | Underwood | 2003/0014623 A1 | 1/2003 | Freed et al. |
| 7,103,068 B1 | 9/2006 | Gardner et al. | 2003/0039354 A1* | 2/2003 | Kimble et al. .................. 380/37 |
| 7,107,285 B2 | 9/2006 | von Kaenel et al. | 2003/0046586 A1 | 3/2003 | Bheemarasetti et al. |
| 7,113,779 B1 | 9/2006 | Fujisaki | 2003/0046587 A1 | 3/2003 | Bheemarasetti et al. |
| 7,114,180 B1 | 9/2006 | DeCaprio | 2003/0055962 A1 | 3/2003 | Freund et al. |
| 7,120,596 B2 | 10/2006 | Hoffman et al. | 2003/0084162 A1 | 5/2003 | Johnson et al. |
| 7,120,690 B1 | 10/2006 | Krishnan et al. | 2003/0084165 A1 | 5/2003 | Kjellberg et al. |
| 7,124,101 B1 | 10/2006 | Mikurak | 2003/0088698 A1 | 5/2003 | Singh et al. |
| 7,124,442 B2 | 10/2006 | Nash-Putnam | 2003/0088788 A1 | 5/2003 | Yang |
| 7,130,792 B2 | 10/2006 | Tokieda et al. | 2003/0112809 A1 | 6/2003 | Bharali et al. |
| 7,130,807 B1 | 10/2006 | Mikurak | 2003/0112823 A1 | 6/2003 | Collins et al. |
| 7,135,991 B2 | 11/2006 | Slemmer et al. | 2003/0123481 A1 | 7/2003 | Neale et al. |
| 7,136,645 B2 | 11/2006 | Hanson et al. | 2003/0131079 A1 | 7/2003 | Neale et al. |
| 7,140,044 B2 | 11/2006 | Redlich et al. | 2003/0131263 A1 | 7/2003 | Keane et al. |
| 7,143,153 B1 | 11/2006 | Black et al. | 2003/0149899 A1 | 8/2003 | Boden et al. |
| 7,146,644 B2 | 12/2006 | Redlich et al. | 2003/0177389 A1 | 9/2003 | Albert et al. |
| 7,149,698 B2 | 12/2006 | Guheen et al. | 2003/0182423 A1 | 9/2003 | Shafir et al. |
| 7,149,897 B2 | 12/2006 | Chincheck et al. | 2003/0182431 A1 | 9/2003 | Sturniolo et al. |
| 7,152,047 B1 | 12/2006 | Nagel | 2003/0188001 A1 | 10/2003 | Eisenberg et al. |
| 7,152,092 B2 | 12/2006 | Beams et al. | 2003/0191799 A1 | 10/2003 | Araujo et al. |
| 7,155,518 B2 | 12/2006 | Forslow | 2003/0191812 A1 | 10/2003 | Agarwalla et al. |
| 7,165,041 B1 | 1/2007 | Guheen et al. | 2003/0198189 A1 | 10/2003 | Roberts et al. |
| 7,171,379 B2 | 1/2007 | Menninger et al. | 2003/0200295 A1 | 10/2003 | Roberts et al. |
| 7,181,766 B2 | 2/2007 | Bendinelli et al. | 2003/0200353 A1 | 10/2003 | Dogra et al. |
| 7,188,273 B2 | 3/2007 | Allen et al. | 2003/0208602 A1 | 11/2003 | Bhalla et al. |
| 7,191,252 B2 | 3/2007 | Redlich et al. | 2003/0212776 A1 | 11/2003 | Roberts et al. |
| 7,194,761 B1 | 3/2007 | Champagne | 2003/0217126 A1 | 11/2003 | Polcha et al. |
| 7,197,751 B2 | 3/2007 | Fedotov et al. | 2003/0223418 A1 | 12/2003 | Desai et al. |
| 7,206,811 B2 | 4/2007 | Skurikhin et al. | 2003/0229718 A1 | 12/2003 | Tock et al. |
| 7,216,173 B2 | 5/2007 | Clayton et al. | 2004/0006708 A1 | 1/2004 | Mukherjee et al. |
| 7,219,127 B2 | 5/2007 | Huck et al. | 2004/0031058 A1 | 2/2004 | Reisman |
| 7,221,660 B1 | 5/2007 | Simonson et al. | 2004/0034794 A1 | 2/2004 | Mayer et al. |
| 7,222,305 B2 | 5/2007 | Teplov et al. | 2004/0039827 A1 | 2/2004 | Thomas et al. |
| 7,225,244 B2 | 5/2007 | Reynolds et al. | 2004/0044521 A1 | 3/2004 | Chen et al. |
| 7,228,459 B2 | 6/2007 | Jiang et al. | 2004/0049515 A1 | 3/2004 | Haff et al. |
| 7,260,617 B2 | 8/2007 | Bazinet et al. | 2004/0078772 A1* | 4/2004 | Balay et al. ..................... 716/12 |
| 7,260,840 B2 | 8/2007 | Swander et al. | 2004/0087304 A1 | 5/2004 | Buddhikot et al. |
| 7,321,906 B2 | 1/2008 | Green | 2004/0100976 A1 | 5/2004 | Chang et al. |
| 7,340,772 B2 | 3/2008 | Panasyuk et al. | 2004/0103438 A1 | 5/2004 | Yan et al. |
| 7,353,533 B2 | 4/2008 | Wright et al. | 2004/0107360 A1 | 6/2004 | Herrmann et al. |
| 7,363,347 B2 | 4/2008 | Thomas | 2004/0111519 A1 | 6/2004 | Fu et al. |
| 7,398,552 B2 | 7/2008 | Pardee et al. | 2004/0141525 A1 | 7/2004 | Bhushan et al. |
| 7,420,992 B1 | 9/2008 | Fang et al. | 2004/0143734 A1 | 7/2004 | Buer et al. |
| 7,512,702 B1 | 3/2009 | Srivastava et al. | 2004/0177158 A1 | 9/2004 | Bauch et al. |
| 2001/0030970 A1 | 10/2001 | Wiryaman et al. | 2004/0202171 A1* | 10/2004 | Hama ........................ 370/395.1 |
| 2001/0037387 A1 | 11/2001 | Gilde et al. | 2004/0203296 A1* | 10/2004 | Moreton et al. .............. 439/894 |
| 2001/0047406 A1 | 11/2001 | Araujo et al. | 2004/0205439 A1 | 10/2004 | Carmeli et al. |
| 2001/0049717 A1 | 12/2001 | Freeman et al. | 2004/0249975 A1 | 12/2004 | Tuck et al. |
| 2002/0016827 A1 | 2/2002 | McCabe et al. | 2004/0258003 A1 | 12/2004 | Kokot et al. |
| 2002/0023210 A1 | 2/2002 | Tuomenoksa et al. | 2005/0013280 A1 | 1/2005 | Buddhikot et al. |
| 2002/0026478 A1 | 2/2002 | Rodgers et al. | 2005/0044350 A1 | 2/2005 | White et al. |
| 2002/0026531 A1 | 2/2002 | Keane et al. | 2005/0050317 A1 | 3/2005 | Kramer et al. |
| 2002/0029285 A1 | 3/2002 | Collins | 2005/0055690 A1* | 3/2005 | Cornillon et al. .............. 717/174 |
| 2002/0032725 A1 | 3/2002 | Araujo et al. | 2005/0058112 A1 | 3/2005 | Lahey et al. |
| 2002/0032798 A1 | 3/2002 | Xu | 2005/0080907 A1 | 4/2005 | Panasyuk et al. |
| 2002/0035451 A1 | 3/2002 | Rothermel | 2005/0108412 A1 | 5/2005 | Sjollema et al. |
| 2002/0035596 A1 | 3/2002 | Yang et al. | 2005/0108517 A1 | 5/2005 | Dillon et al. |
| 2002/0038339 A1 | 3/2002 | Xu | 2005/0125663 A1 | 6/2005 | Funk |
| 2002/0042875 A1 | 4/2002 | Shukla | 2005/0132030 A1 | 6/2005 | Hopen et al. |
| 2002/0065919 A1 | 5/2002 | Taylor et al. | 2005/0144186 A1 | 6/2005 | Hesselink et al. |
| 2002/0069278 A1 | 6/2002 | Forslow | 2005/0144481 A1 | 6/2005 | Hopen et al. |
| 2002/0071438 A1 | 6/2002 | Singh | 2005/0147126 A1* | 7/2005 | Qiu et al. ....................... 370/474 |
| 2002/0073061 A1 | 6/2002 | Collins | 2005/0149481 A1 | 7/2005 | Hesselink et al. |
| 2002/0081971 A1 | 6/2002 | Travostino | 2005/0149726 A1 | 7/2005 | Joshi et al. |
| 2002/0083175 A1 | 6/2002 | Afek et al. | 2005/0165928 A1 | 7/2005 | Shu et al. |
| 2002/0083183 A1 | 6/2002 | Pujare et al. | 2005/0193075 A1 | 9/2005 | Haff et al. |
| 2002/0098840 A1 | 7/2002 | Hanson et al. | 2005/0195780 A1* | 9/2005 | Haverinen et al. ............ 370/338 |
| 2002/0099940 A1 | 7/2002 | Wang | 2005/0198380 A1 | 9/2005 | Panasyuk et al. |
| 2002/0101848 A1* | 8/2002 | Lee et al. ..................... 370/349 | 2005/0198532 A1* | 9/2005 | Comlekoglu et al. ......... 713/201 |
| 2002/0101860 A1 | 8/2002 | Thornton et al. | 2005/0210150 A1 | 9/2005 | Bahl |
| 2002/0126675 A1 | 9/2002 | Yoshimura et al. | 2005/0232161 A1 | 10/2005 | Maufer et al. |
| 2002/0138572 A1 | 9/2002 | Delany et al. | 2005/0246445 A1 | 11/2005 | Panasyuk et al. |
| 2002/0138618 A1 | 9/2002 | Szabo | 2005/0256923 A1 | 11/2005 | Adachi |
| 2002/0152373 A1 | 10/2002 | Sun et al. | 2005/0262357 A1 | 11/2005 | Araujo et al. |
| 2002/0152423 A1 | 10/2002 | McCabe | 2005/0265353 A1 | 12/2005 | Sengupta et al. |
| 2002/0176532 A1 | 11/2002 | McClelland et al. | 2005/0267974 A1 | 12/2005 | Panasyuk et al. |
| 2002/0184224 A1 | 12/2002 | Haff et al. | 2005/0286466 A1 | 12/2005 | Tagg et al. |

| | | | |
|---|---|---|---|
| 2006/0005240 | A1 | 1/2006 | Sundarrajan et al. |
| 2006/0185010 | A1* | 8/2006 | Sultan .............................. 726/12 |
| 2006/0225130 | A1 | 10/2006 | Chen et al. |
| 2007/0130334 | A1 | 6/2007 | Carley |
| 2007/0169179 | A1* | 7/2007 | Narad .............................. 726/4 |
| 2007/0233910 | A1* | 10/2007 | Paley et al. ..................... 710/36 |

FOREIGN PATENT DOCUMENTS

| | | |
|---|---|---|
| CN | 1410905 A | 4/2003 |
| EP | 1045553 | 10/2000 |
| EP | 1134942 | 9/2001 |
| EP | 1427133 | 6/2004 |
| EP | 1432209 | 6/2004 |
| JP | 7302237 | 11/1995 |
| JP | 07302237 | 11/1995 |
| JP | 08006910 A | 1/1996 |
| JP | 10178450 | 6/1998 |
| WO | WO-01/47185 A2 | 6/2001 |
| WO | WO-02/23362 A1 | 3/2002 |
| WO | WO-03/048936 A1 | 6/2003 |
| WO | WO-03/083692 | 10/2003 |
| WO | WO-200524567 A2 | 3/2005 |
| WO | WO-2005048106 | 5/2005 |
| WO | WO-2006/012612 | 2/2006 |
| WO | WO-2006/020823 | 2/2006 |

OTHER PUBLICATIONS

Office action for European Application No. 05776653.7. Dated Oct. 5, 2007. 7 pages.
Non Final Office Action dated Jan. 24, 2008 pertaining to U.S. Appl. No. 10/988,004. 6 pages.
Office Action for U.S. Appl. No. 11/039,946 mailed on Jun. 23, 2008, 11 pages.
International Search Report for PCT/US2005/022884, mailed on Jul. 8, 2008.
Written Opinion of the ISA for PCT/US2005/022884, mailed on Jul. 8, 2008.
EP Communication for EP Patent Application No. 07007414.1 dated Jun. 5, 2008. (6 pages).
EP Communication from EP Patent Application No. 05 785 297.2, dated May 18, 2007, 2 pages.
European Search Report for European Patent Application No. EP 07007414 dated Jul. 16, 2007. (2 pages).
Final Office Action dated Dec. 9, 2008 pertaining to U.S. Appl. No. 11/187,562. 15 pages.
Final Office Action dated Dec. 23, 2008 pertaining to U.S. Appl. No. 11/188,279. 12 pages.
International Search Report for PCT/US2005/028663, Mailing date: Nov. 16, 2005. 3 pages.
International Search Report to PCT/US04/37918, mailed on Apr. 27, 2008, 1 page.
International Search Report to PCT/US2005/026296, mailed on Jan. 31, 2006, 5 pgs.
Ipswitch Inc., WSFTP User's Guide, Chapter 8: Security, Jun. 25, 2003, 8 pages.
Non Final Office Action dated Jun. 10, 2008 pertaining to U.S. Appl. No. 11/187,562. 15 pages.
Non Final Office Action dated Aug. 5, 2008 pertaining to U.S. Appl. No. 11/161,091. 17 pages.
Non Final Office Action dated Aug. 20, 2008 pertaining to U.S. Appl. No. 11/161,092. (16 pages).
Non Final Office Action dated Oct. 28, 2008 pertaining to U.S. Appl. No. 11/161,656. 21 pages.
Non Final Office Action dated Dec. 11, 2007 pertaining to U.S. Appl. No. 10/683,881. 10 pages.
Non Final Office Action dated Jun. 26, 2008 pertaining to U.S. Appl. No. 11/188,279. 12 pages.
Notice of Allowance dated Sep. 18, 2008. USPTO U.S. Appl. No. 10/988,004 5 pgs.
Office Action dated Sep. 26, 2008 from Chinese Application No. 200480040249.X corresponding to U.S. Appl. No. 10/988,004 22 pgs.
Written Opinion of the International Searching Authority to PCT/US04/37918, mailed on Apr. 27, 2005, 7 pages.
Written Opinion of the International Searching Authority to PCT/US2005/026296, mailed on Jan. 31, 2006.
Written Opinion of the International Searching Authority to PCT/US2005/026300; Mailed on Dec. 16, 2005, 7 pages.
Written Opinion of the International Searching Authority to PCT/US2005/028663; Mailed on Nov. 16, 2005, 7 pages.
Examination report for EP appl. 05776653.7 dated Apr. 20, 2009.
Examination report for AU appl. 2005272779 dated Apr. 23, 2009.
Office action for U.S. Appl. No. 11/161,091 dated Feb. 18, 2009.
Office Action for U.S. Appl. No. 11/161,092 dated Feb. 12, 2009.
Office Action for U.S. Appl. No. 11/161,093 dated Jan. 2, 2009.
Office Action for U.S. Appl. No. 11/187,562 dated Apr. 27, 2009.
Office Action for U.S. Appl. No. 11/187,512 dated Mar. 3, 2009.
Advisory Action for U.S. Appl. No. 11/039,946 dated Mar. 24, 2009.
Office Action for U.S. Appl. No. 11/039,946 dated Jan. 23, 2009.
Office Action for U.S. Appl. No. 11/039,946 dated Jun. 23, 2009.
Office action for U.S. Appl. No. 11/161,091 dated Aug. 3, 2009.
Exam Report for AU appln 2005272779 dated Apr. 23, 2009.
Exam Report for EP appln 05776653.7 dated Apr. 20, 2009.
Exam Report for AU appln 2005266943 dated May 14, 2009.
Exam Report for AU appln 2005266945 dated Jul. 21, 2009.
Advisory Action for U.S. Appl. No. 11/161,091 dated May 6, 2009.
Notice of Allowance for U.S. Appl. No. 11/161,092 dated Jun. 11, 2009.
Advisory Action for U.S. Appl. No. 11/161,092 dated Apr. 24, 2009.
Office Action for U.S. Appl. No. 11/161,093 dated Jun. 19, 2009.
Advisory Action for U.S. Appl. No. 11/161,656 dated Jul. 29, 2009.
Office Action for U.S. Appl. No. 11/161,656 dated May 13, 2009.
Office action for U.S. Appl. No. 11/161,091 dated Feb. 24, 2010.
Office Action for U.S. Appl. No. 11/161,093 dated Feb. 22, 1010.
Office Action for U.S. Appl. No. 11/161,093 dated Sep. 2, 2009.
Examination report for EP Appl. 05785297.2 dated Jun. 19, 2009.
Office Action for U.S. Appl. No. 11/187,512 dated Sep. 15, 2009.
Advisory Action for U.S. Appl. No. 11/161,093 dated Dec. 14, 2009.
Advisory Action for U.S. Appl. No. 11/161,093 dated Nov. 16, 2009.
Exam Report for EP appln 070074141 dated Nov. 17, 2009.
Office Action for CN appln 200580034849.X dated Sep. 25, 2009.
Notice of Allowance for U.S. Appl. No. 11/161,656 dated Sep. 18, 2009.
Office Action for U.S. Appl. No. 11/187,512 dated Dec. 23, 2009.
Notice of Allowance for U.S. Appl. No. 11/188,279 dated Jun. 29, 2009.
Office action for U.S. Appl. No. 11/161,090 dated Feb. 4, 2009.
Office Action for CN appl. 00480040249.X dated Jun. 19, 2009.
Office Action for CN appl. 200580028535 dated Jan. 15, 2010.
Notice of Allowance for U.S. Appl. No. 11/039,946 dated Mar. 7, 2010.
Office Action for CN appl. 200580030928.3 dated Apr. 23, 2010.
Office Action for U.S. Appl. No. 11/875,12 dated Jun. 22. 2010.
Office Action for JP appl. 2006-539930 dated Feb. 12, 2010.
Office Action for CN appl. 200580034849X dated Apr. 7, 2010.
Office Action for U.S. Appl. No. 11/188,274 dated Mar. 29, 2010.
Office Action for U.S. Appl. No. 11/188,274 dated Sep. 8, 2010.
Restriction Requirement for U.S. Appl. No. 11/161,093 dated Jul. 26, 2010.
Notice of Acceptance for AU appl. 2005272779 dated May 26, 2010.
Notice of Acceptance for AU appl. 2005266943 dated May 28, 2010.
Office Action for CN Appl. 200580034849X dated Aug. 3, 2010. (9 pages).
Office Action for IN Appl. 1514KOLNP2006 dated Sep. 7, 2010. (3 pages).
Office Action for JP Appl. 2007-048002 dated Nov. 1, 2010. (7 pages) (English Abstract).
Office Action for JP Appl. 2007-048003 dated Nov. 1, 2010. (7 pages) (English Abstract).
Office Action for JP Appl. 2007-519353 dated Jul. 12, 2010. (6 pages) (English Abstract).
Office Action for JP Appl. 2007-522841 dated Sep. 10, 2010. (9 pages) (English Abstract).
Office Action for U.S. Appl. No. 11/188,274 dated Mar. 29, 2010. (15 pages).
Office Action for JP Appl. 2007-525810 dated Aug. 4, 2010. (9 pages) (English Abstract).

Yoshikazu Kobayashi, VPN service introduction, Computer & Network LAN, vol. 21, No. 3, Mar. 1, 2003, pp. 25-40. (19 pages) (English Abstract).

Teruhara Serada, "SSL VPN", N+1 Network, vol. 4, No. 8, Aug. 1, 2004, pp. 76-79. (8 pages) (English Abstract).

Office Action for U.S. Appl. No. 11/188,274 dated Sep. 8, 2010. (19 pages).

Restriction Requirement for U.S. Appl. No. 11/161,093 dated Jul. 26, 2010. (9 pages).

Noriaki Kobayashi, "Internet VPN", N+1 Network Guide, vol. 3, No. 9, Oct. 1, 2003, pp. 44-49. (9 pages) (English Abstract).

Office Action for U.S. Appl. No. 11/161,093 dated Oct. 1, 2010. (10 pages).

Office Action for U.S. Appl. No. 12/557,497 dated Nov. 19, 2010. (25 pages).

* cited by examiner

METHODS AND SYSTEMS FOR SECURING ACCESS TO PRIVATE NETWORKS USING ENCRYPTION AND AUTHENTICATION TECHNOLOGY BUILT IN TO PERIPHERAL DEVICES

RELATED APPLICATIONS

This present application claims priority to U.S. Provisional Patent Application No. 60/590,837, entitled "Ad Hoc Distributed Networks And Remote Access Architecture," filed Jul. 23, 2004, and U.S. Provisional Patent Application No. 60/601,431, entitled "System And Method For Assuring Redundancy In Remote Access Solutions," filed Aug. 13, 2004, and U.S. Provisional Patent Application No. 60/607,420, entitled "Virtual Network Bridging", filed Sep. 3, 2004, and U.S. Provisional Patent Application No. 60/634,379, entitled "Securing Access to Private Networks from End Points Based on Encryption and Authentication Technology Built into the USB or Other Peripheral Devices Without the Need for Additional Software on the Host Operating System", filed Dec. 7, 2004, all of which are incorporated herein by reference.

FIELD OF THE INVENTION

The present invention relates to a method and systems for securing access to private networks and, in particular, to a method and systems for securing access to private networks using encryption and authentication technology built in to peripheral devices.

BACKGROUND OF THE INVENTION

Conventional methods for routing packets from a client computer to a private network using a Virtual Private Network (VPN) gateway include methods for packet interception and re-routing. In some methods, an administrator uses a network abstraction layer, such as the Network Device Interface Specification (NDIS) network abstraction layer provided in the Microsoft Windows Operating System. An administrator may implement NDIS to create virtual adapters that expose a routing interface to Windows or to NDIS intermediate drivers. These virtual adapters (also known as NDIS shims) capture packet traffic sent across routing interfaces. Alternatively, administrators may implement a dialer-type interface to intercept packets. The dialer-type interface may include interfaces such as a TUN/TAP interface, which enables virtual point-to-point network devices and virtual Ethernet network devices.

These software interfaces are typically logical software layers residing above a physical interface and intercepting packets as the packets are transmitted from the physical interface through an operating system network stack. The software interfaces may encrypt and send the intercepted packets to a virtual private network gateway responsible for decrypting the packets and re-routing them to the original destinations.

Typically, when deploying VPN client applications on client computers, administrators install the software interfaces on each client computer. Installation of these software interfaces typically requires administrative privileges on the client computer and may require physical access to the client computer. Such installations may be cumbersome for an information technology administrative staff to manage and deploy. A flexible method for providing secure access to a private network, enabling authentication of packets prior to transmission to a VPN gateway, and providing ease of installation, would be desirable.

SUMMARY OF THE INVENTION

The present invention relates to a method of and systems for securing access to private networks using encryption and authentication technology built in to peripheral devices. In one embodiment, the present invention utilizes the Microsoft Windows Operating System extension known as Remote NDIS (R-NDIS) to enable execution of a VPN client application on a client system. Universal serial bus (USB) devices may identify themselves to a client system as both a mass storage device and as a network category USB device implement the peripheral side of R-NDIS. R-NDIS negotiates a DHCP address from the USB peripheral and modifies local routing tables on the client system such that the client system may transmit internet protocol (IP) packets to the USB device. A USB device may therefore transmit the received packets to a VPN client application for encryption and forwarding to a VPN gateway. Use of such a composite USB device enables secure routing of encrypted IP packets from a client system to a private network, across a VPN gateway, without requiring access to the client system or installation of software on the client system.

In one aspect, the invention relates to a method for routing packets from a peripheral device to a Virtual Private Network (VPN) gateway. A peripheral device implements a change to a routing table. The peripheral device receives an outbound packet. The peripheral device transmits information about the outbound packet to a VPN client application. The peripheral device rewrites address information on the outbound packet. The peripheral device transmits the modified outbound packet to the VPN client application.

In one embodiment, the peripheral device receives the outbound packet responsive to the change implemented in the routing table. In another embodiment, the peripheral device rewrites the destination address and destination port on the outbound packet, replacing the address information with a destination address and destination port associated with the VPN client application. In some embodiments, the VPN client application forwards the outbound packet to a VPN gateway. In one of these embodiments, the VPN client application may forward the outbound packet responsive to the information received about the outbound packet from the peripheral device. In one embodiment, the peripheral device comprises a universal serial bus storage device.

In another aspect, the invention relates to a device for routing packets to a Virtual Private Network gateway. The device comprises a routing element, a receiver, a transmitter, and a packet rewriter. The routing element implements a change to the routing table. The receiver receives an outbound packet. The transmitter transmits information about the outbound packet to a VPN client application. The packet rewriter rewrites address information on the outbound packet.

In some embodiments, the packet rewriter replaces a destination address on the outbound packet with a destination address and a destination port associated with the VPN client application. In one embodiment, the transmitter transmits the rewritten outbound packet to the VPN client application. In another embodiment, the packet rewriter generates a mapping table associating information in the outbound packet with information in the modified outbound packet. In still another embodiment, the VPN client application forwards the outbound packet to a VPN gateway.

In still another aspect, the invention relates to a system for routing packets to a VPN gateway. The system comprises a computer system and a peripheral device. The computer system receives at least one outbound packet and stores a routing table. The peripheral device, in communication with the computer system, comprises a routing element, a receiver, a transmitter, and a packet rewriter. The routing element implements a change to the routing table. The receiver receives the at least one outbound packet from the computer system. The transmitter transmits information about the outbound packet to a VPN client application. The packet rewriter, in communication with the receiver and the transmitter, replaces a destination address on the outbound packet with a destination address and a destination port associated with the Virtual Private Network client application.

In one embodiment, the peripheral device is a Universal Serial Bus storage device. In another embodiment, the peripheral device includes a reporting element identifying the peripheral device to the computer system as a mass storage device and as a networking device. In still another embodiment, the computer system includes a device driver enabling communication between the computer system and the peripheral device.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE INVENTION

Figure 1:
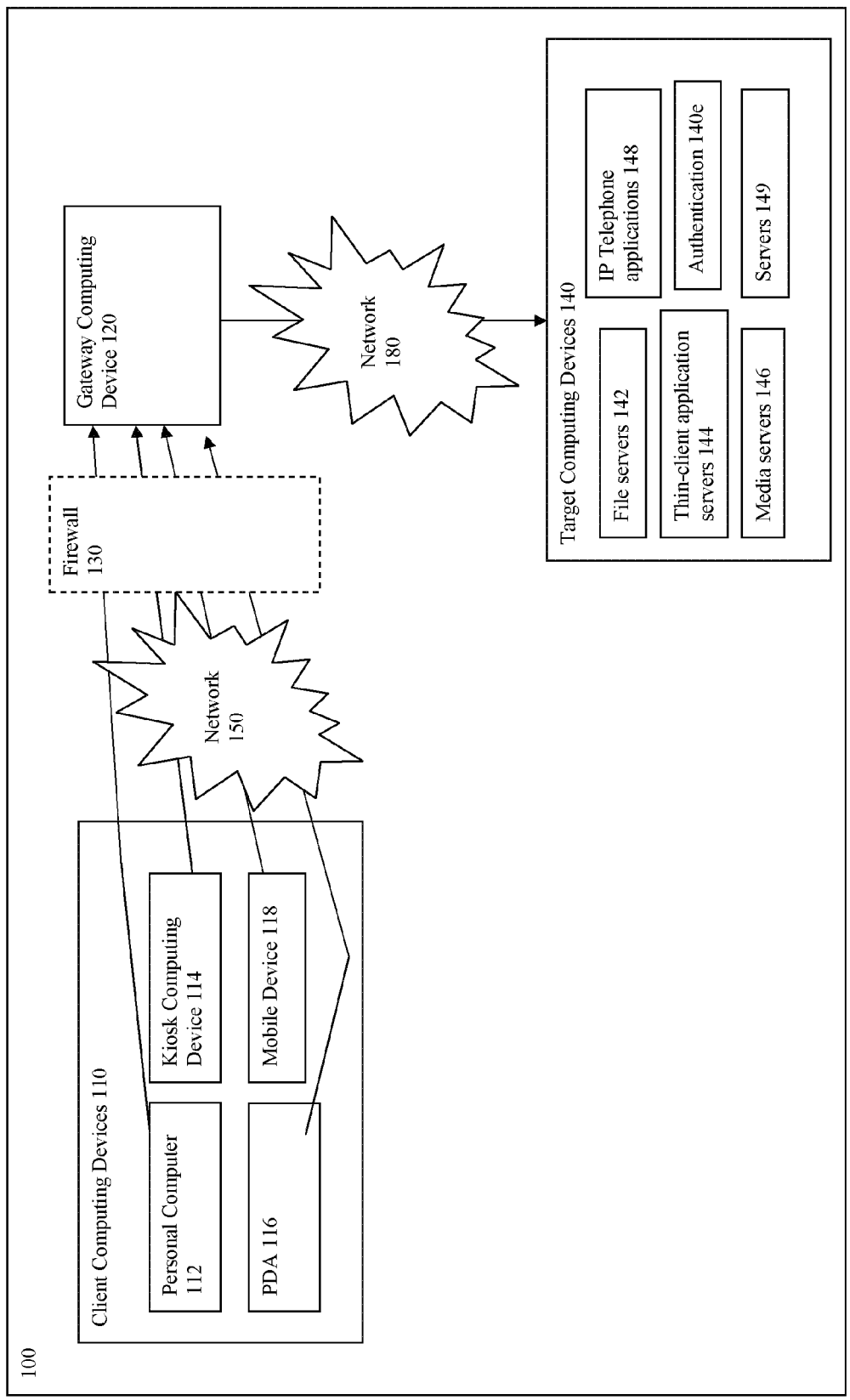
FIG. 1 is a block diagram depicting a system in which client computing devices access a gateway computing device over a first network.

Referring now to FIG. 1, a block diagram of a system is shown in which client computing devices 110 access a gateway computing device 120 over a first network 150. In some embodiments, the client computing devices 110 access the gateway computing device 120 through a firewall 130, shown in phantom view. In turn, the gateway computing device 120 communicates with target computing devices 140 over a second network 180. Although FIG. 1 shows only one gateway computing device 120 and one type of each of the client computing devices 110 and target computing devices 140, it should be understood that any number of those devices may be present.

As shown in FIG. 1, a client computing device 110 may include a personal computer 112, a computing kiosk 114, a personal digital assistant (PDA) 116 or cell phone 118. In some embodiments, a computing kiosk 114 is a personal computer that had been configure to allow access by multiple users, typically in a public location and usually for a fee.

Figure 2A:
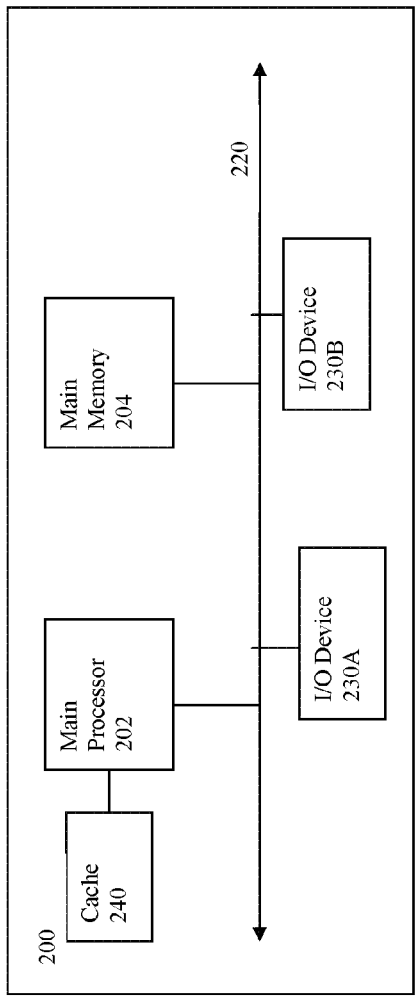
FIGS. 2A and 2B are block diagrams depicting embodiments of a computer useful in connection with the present invention.
Figure 2B:
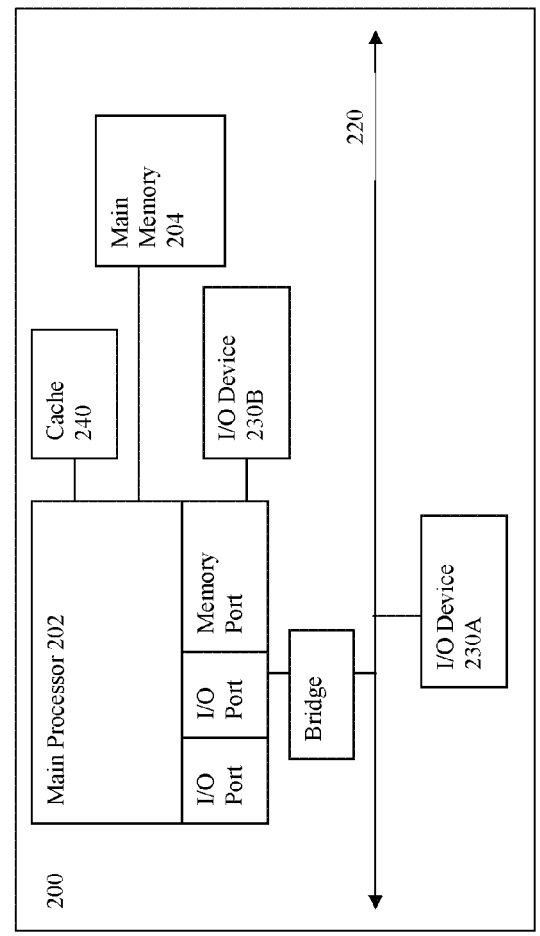

FIG. 2A and FIG. 2B depict block diagrams of a typical computer 200 useful for embodiments in which the client computing device 110 is a personal computer 112 and embodiments in which the kiosk computing device 114 is provided as a personal computer a personal computer, of the sort manufactured by the Hewlett-Packard Corporation of Palo Alto, Calif. or the Dell Corporation of Round Rock, Tex. As shown in FIG. 2A and FIG. 2B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athlon 64 FX, the AMD Athlon, or the AMD Duron processor, manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 2A, the processor 202 communicates with main memory 204 via a system bus 220 (described in more detail below). FIG. 2B depicts an embodiment of a computer 200 in which the processor communicates directly with main memory 204 via a memory port. For example, in FIG. 2B, the main memory 204 may be DRDRAM.

FIG. 2A and FIG. 2B depict embodiments in which the main processor 202 communicates directly with cache memory 240 via a secondary bus, sometimes referred to as a "backside" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 220. Various buses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 202 may use an Advanced Graphics Port (AGP) to communicate with the display. FIG. 2B depicts an embodiment of a computer 200 in which the main processor 202 communicates directly with I/O device 230b via HyperTransport, Rapid I/O, or InfiniBand. FIG. 2B also depicts an embodiment in which local busses and direct communication are mixed: the processor 202 communicates with I/O device 230a using a local interconnect bus while communicating with I/O device 130b directly.

A wide variety of I/O devices 230 may be present in the computer 200. Input devices include keyboards, mice, trackpads, trackballs, microphones, and drawing tablets. Output devices include video displays, speakers, inkjet printers, laser printers, and dye-sublimation printers.

In further embodiments, an I/O device 230 may be a bridge between the system bus 120 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIG. 2A and FIG. 2B typically operate under the control of operating systems, which control scheduling of tasks and access to system resources. Typical operating systems include: MICROSOFT WINDOWS, manufactured by Microsoft Corp. of Redmond, Washington; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

A computer 200 may also be any personal computer (e.g., 286-based, 386-based, 486-based, Pentium-based, Pentium II-based, Pentium III-based, Pentium 4-based, Pentium M-based, or Macintosh computer), Windows-based terminal, Network Computer, wireless device, information appliance, RISC Power PC, X-device, workstation, mini computer, main frame computer, personal digital assistant, or other computing device. Windows-oriented platforms supported by the computer 200 can include, without limitation, WINDOWS 3.x, WINDOWS 95, WINDOWS 98, WINDOWS NT 3.51, WINDOWS NT 4.0, WINDOWS 2000, WINDOWS CE, WINDOWS ME, WINDOWS XP, WINDOWS Longhorn, MAC/OS, Java, and UNIX. The computer 200 can include a visual display device (e.g., a computer monitor), a data entry device (e.g., a keyboard), persistent or volatile storage (e.g., computer memory) for storing downloaded application programs, a processor, and a mouse. Execution of a communication program allows the system 200 to participate in a distributed computer system model.

For embodiments in which the client computing device 110 is a mobile device, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. A typical mobile device may comprise many of the elements described in FIGS. 2A and 2B, including the processor 202 and the main memory 204.

In other embodiments in which the client computing device 110 is mobile, it may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the computer 100 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the computer 100 is a combination PDA/telephone device such as the Treo 180, Treo 270, Treo 600, or the Treo 650, all of which are manufactured by palmOne, Inc. of Milpitas, Calif. In still further embodiments, the client computing device 110 is a cellular telephone that operates under control of the PocketPC operating system, such as the MPx200, manufactured by Motorola Corp. A typical combination PDA/telephone device may comprise many of the elements described in FIGS. 2A and 2B, including the processor 202 and the main memory 204.

Referring back to FIG. 1, the gateway computing device 120 may be a computer such as those described above. In some embodiments, the gateway computing device is physically configured as a blade server or a multi-processor computer server. In still other embodiments, the gateway computing device may be a virtualized server operating one processor of a multi-processor system.

Client computing devices 110 communicate with the gateway computing device 120 over a first network 150. In some embodiments, client computing devices 110 communicate over a network connection. The network can be a local area network (LAN), a metropolitan area network (MAN), or a wide area network (WAN) such as the Internet. The client computing devices 110 and the gateway computing device 120 may connect to a network through a variety of connections including standard telephone lines, LAN or WAN links (e.g., T1, T3, 56 kb, X.25), broadband connections (ISDN, Frame Relay, ATM), and wireless connections. Connections between the client computing devices 110 and the gateway computing device 120 may use a variety of data-link layer communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11 a, IEE 802.11 b, IEEE 802.11 g and direct asynchronous connections).

Still referring to FIG. 1, target computing systems 140 may include file servers 142, thin-client application servers 144, media servers 146, IP telephone applications 148, and servers 149 providing traditional, "fat-client" client-sever applications for execution. The gateway computing device 120 communicates with the target computing devices 140 via a second network 180. The second network 180 may use any of protocols and transport mechanisms described above in connection with the first network 150.

Figure 3:
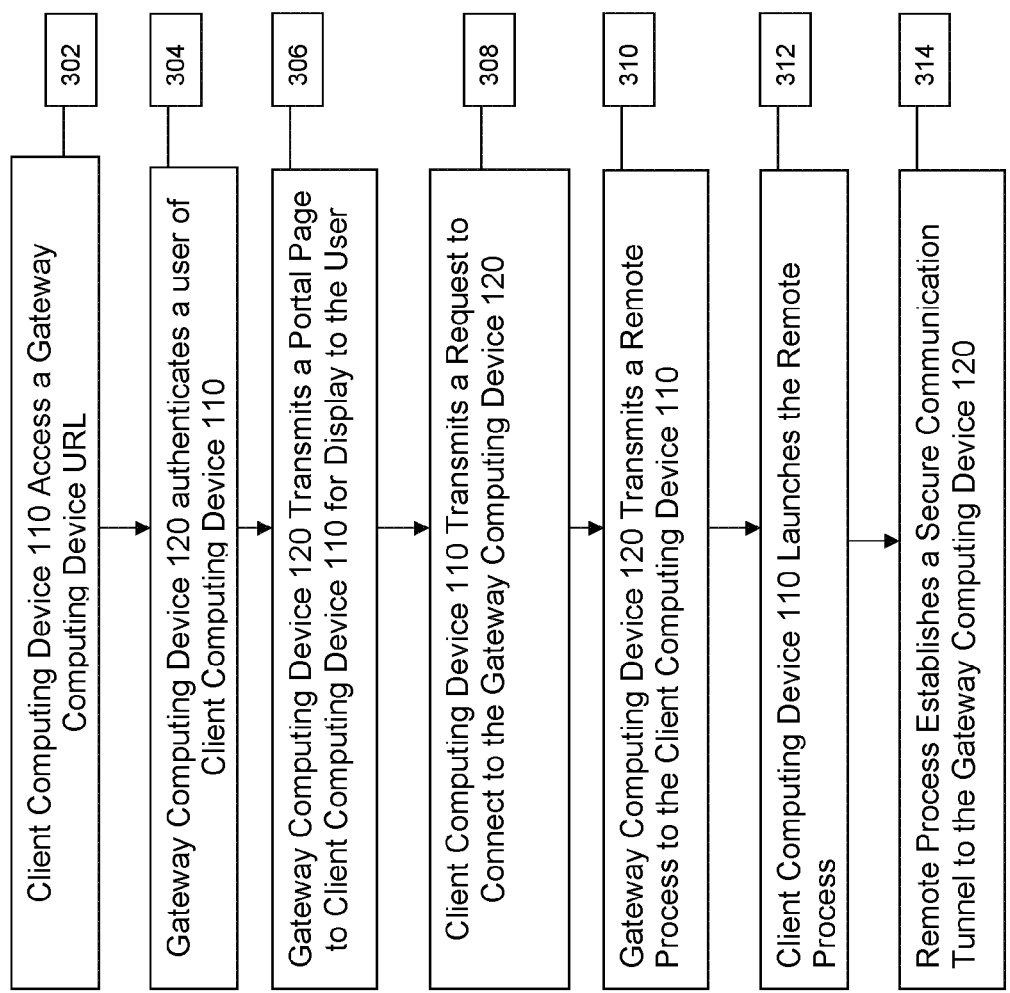
FIG. 3 is a flow diagram depicting one embodiment of the steps taken to establish a secure connection between a client computing device and a gateway computing device.

Referring now to FIG. 3, one embodiment of the steps taken to establish a secure connection between a client computing device 110 and a gateway computing device 120 is shown. In brief overview, the client computing device 110 accesses the gateway computing device URL (step 302). The gateway computing device 120 authenticates the user of the client computing device 110 (step 304) and transmits a portal page to the client computing device 110 for display to the user (step 306). The client computing device 110 transmits a request to connect to the gateway computing device 120 (step 308). The gateway computing device 120 transmits a remote process to the client computing device 110 (step 310). The client computing device 110 launches the remote process (step 312). Once launched, the remote process establishes a secure communication tunnel to the gateway computing device 120 (step 314).

Still referring to FIG. 3, and now in greater detail, the client computing device 110 accesses the gateway computing device URL (step 302). In some embodiments, the gateway computing device URL is a public URL accessible to any browser application. The gateway computing device 120 responds to the request for the gateway computing device URL by transmitting a page to the client computing device 110 prompting the user of the client computing device for authentication information.

The gateway computing device 120 authenticates the user of the client computing device 110 (step 304). In some embodiments, the gateway computing device 120 prompts the user for authentication credentials using HTTP 401 Basic, Digest, or NTLM. Once credentials are received from the user, authentication may occur using LDAP, RADIUS, two-factor authentication techniques, authentication certificates, or biometric techniques. For example, the user may authenticate using token-based, two-factor authentication techniques such SecurID tokens, manufactured and sold by RSA Security Inc. of Bedford, Mass. or SafeWord tokens manufactured by Secure Computing of San Jose, Calif.

The gateway computing device 120 transmits a portal page to the client computing device 110 for display to the user (step 306). In some embodiments, the portal page requests additional information from the user, such as the user's location, the capabilities of the client computing device 110, or whether the user owns the client computing device 110. In other embodiments, the portal page allows the user to specify particular network resources to which the user wants access. In still other embodiments, the portal page provides a button for the user to select to establish the connection.

The client computing device 110 transmits a request to connect to the gateway device 120 (step 308). In one embodiment, the client computing device 110 automatically transmits the request upon selection by a user of a network resource to access. In other embodiments, the client computing device 110 automatically transmits the request after the user submits information requested by the portal page.

The gateway computing device 120 transmits remote process to the client computing device 110 (step 310). In one embodiment, the remote process comprises a client application. The client application may comprise functionality for receiving a packet, applying a policy to the packet, and determining to transmit the packet to the gateway computing device 110.

In some embodiments, the remote process comprises a driver. The driver may comprise functionality for capturing a packet and determining to forward the packet to the client application, responsive to a filter table received from the client application. In one of these embodiments, the remote process comprises a driver constructed in compliance with the Network Driver Interface Specification (NDIS). In another of these embodiments, the driver comprises a mini-filter. In still another of these embodiments, the driver executes in kernel space on the client computing device 110. In yet another of these embodiments, the driver executes in application space on the client computing device 110. In still another of these embodiments, the driver is transmitted to the client computing device 120 separately from the remote process. In yet another of these embodiments, the gateway computing device 120 determines that the client computing device 110 already comprises an NDIS driver and that transmission of an NDIS driver to the client computing device 110 is not required.

The client computing device 110 launches the remote process (step 312). The client computing device 110 may launch the remote process automatically, at the time of installation. In other embodiments, the client computing device 110 may launch the remote process automatically, at a time when the user of the client computing device 110 requests access to a target computing device 140. In still other embodiments, a user of the client computing device 110 may launch the remote process automatically prior to requesting access to a target computing device 140.

Once launched, the remote process establishes a secure communication tunnel to the gateway computing device 120 (step 314). In embodiments where the remote process is a client application executing in application space, the client application establishes the secure communication tunnel to the gateway computing device 120. In one embodiment, the secure communication tunnel is established over an HTTPS port, such as port 442, or any other configured port on the gateway computing device 120, using TLS or SSL encryption. In another embodiment, the secure communications tunnel may be established using industry standard connection establishment techniques, such as HTTPS, Proxy HTTPS, and SOCKS. Use of these techniques may enable use of the present invention in embodiments where a firewall 130 is implemented. In some embodiments, a connection is made via an intermediate proxy. In one of these embodiments, the client computing device 110 obtains from the user of the client computing device 110 credentials requested by the intermediate proxy.

In some embodiments, the secure communication tunnel is encrypted using industry standard technology, such as SSL and TLS. Upon establishment of the secure communication tunnel, session payload is encrypted and captured IP packets may be securely transmitted to the gateway computing device 120. Packets and packet header information transmitted across the secure communication tunnel are encrypted. The secure communication tunnel may support 196-bit encryption as well as higher or lower bit values. In one embodiment, the secure communication tunnel supports all OpenSSL ciphers, including CAST, CAST5, DES, Triple-DES, IDEA, RC2, RC4, and RC5.

In some embodiments, the gateway computing device 120 transmits configuration information to the remote process. The configuration information may provide the remote process with descriptive information regarding a network being secured, such as the network 180. The configuration information may also include IP addresses required to enable visibility of the client computing device 110 on one or more networks. The configuration information may further include information needed to validate that the remote process successfully established the communication tunnel. This information may enable the remote process to test and validate client-side certificates, directly or by configuring the client computing device 110 to do so. The information may also comprise authentication information enabling the remote process to validate that the tunnel is established.

In some embodiments, upon the launch of the remote process, the remote process captures all network traffic destined for a private, secured network, such as the network 180. In one of these embodiments, the remote process redirects captured network traffic over the established secure communications tunnel to the gateway computing device 120. In an embodiment where all network traffic is captured and transmitted over a secure link, the present invention provides functionality equivalent to that provided by an IPSec solution.

In one of these embodiments, a TCP connection is initiated by an application executing on the client computing device 110, for transmission of IP packets to a target computing device 140. The remote process captures the IP packets generated by the application. The remote process may send a TCP acknowledgement packet to the application and terminate the TCP connection initiated by the application. The remote process then creates a second TCP connection to the gateway computing device 120 and transmits the captured IP packets to the gateway computing device 120 across the secure communications tunnel. In some embodiments, the remote process may store a captured IP packet in a buffer. In these embodiments, the remote process may transmit the stored IP packet to the gateway computing device 120. Storing the captured IP packets in a buffer enables preservation of the packets in the event of a disruption in the secure communications tunnel between the gateway computing device 120 and the client computing device 110.

In another of these embodiments, upon receipt of the captured IP packets, the gateway computing device 120 may create a third TCP connection between the gateway computing device 120 to the target computing device 140. The gateway computing device 120 may maintain a port-mapped Network Address Translation (NAT) table, enabling the gateway computing device 120 to transmit response packets from the target computing device 140 to the port monitored by the application that originally generated the IP packet on the client computing device 110.

Because the client computing device 110 communicates only with a public network address of the gateway computing device 120, the client computing device 110 is unaware of the network address of the target computing device 140, increasing security to the network on which the target computing device 140 resides. Similarly, since the gateway computing device 120 originates the TCP connection to the target computing device 140, the target computing device 140 does not receive the address information of the client computing device 110, protecting the client computing device and the network on which it resides. Additionally, since the gateway computing device 120 receives the IP packets, the gateway computing device 120 may make a determination responsive to a policy or security check as to whether or not to transmit the IP packets to the target computing device 140, further increasing protection to the network on which the target computing device 140 resides.

In some embodiments, functionality is required that enables the gateway computing device 120 to create a connection to the client computing device 110. The functionality may be required to enable the client computing device 110 to use protocols such as those required by real-time voice applications. In one of these embodiments, the remote process associates the client computing device 110 with a network address on the network 180. In another of these embodiments, a remote process execution on the gateway computing device 120 associates the client computing device 110 with the network address on the network 180. In other embodiments, a remote process execution on the gateway computing device 120 maintains a reverse NAT table.

In one embodiment, the present invention provides a method for securing a packet transmitted from a private, secured network 180 behind a gateway 120 to a client computing device 110 on an external network 150. The invention enables separation of the client computing device from the private network by providing network address translation (NAT) functionality on the gateway. A VPN gateway that uses NAT provides masquerading of IP addresses of a client computing device to shield the private network from direct layer-2 access by the client computing device.

Figure 4:
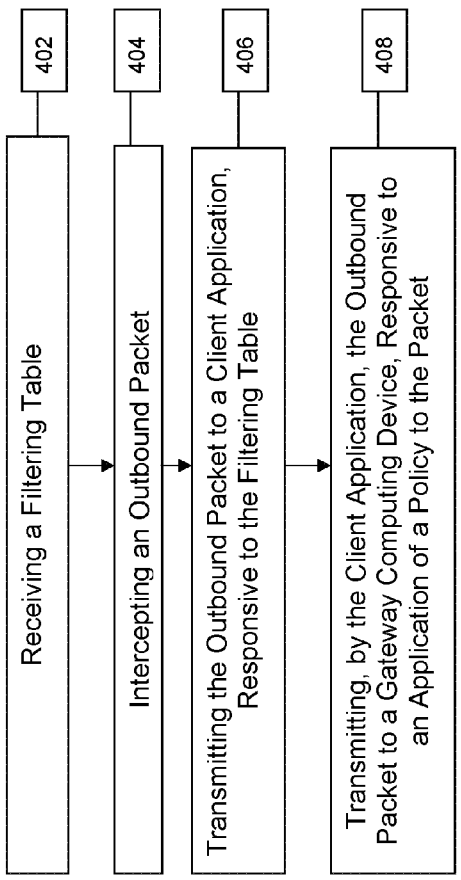
FIG. 4 is a flow diagram depicting one embodiment of the steps taken in a method for routing packets from a client computing device to a gateway.

Referring now to FIG. 4, a flow diagram depicts one embodiment of the steps taken in a method for routing packets from a client computing device to a gateway computing device. In brief overview, a filtering table is received (step 402). An outbound packet is intercepted (step 404). The outbound packet is transmitted to a client application, responsive to the filtering table (step 406). The client application transmits the outbound packet to a gateway computing device, responsive to an application of a policy to the outbound packet (step 408).

A filtering table is received (step 402). In some embodiments, the filtering table includes information about a private network. In other embodiments, a filter on a client computing device receives the filtering table. In one of these embodiments, the filter receives the filtering table from a client application on the client computing device. In another of these embodiments, the filter receives configuration settings from the client application and stores the configuration settings in a filtering table.

An outbound packet is intercepted (step 404). In some embodiments, a filter on a client computing device intercepts the outbound packet. In one of these embodiments, the filter intercepts all outbound packets. In another of these embodiments, the filter inspects an intercepted outbound packet. In still another of these embodiments, the filter inspects an intercepted outbound packet prior to the outbound packet being routed. In another embodiment, the filter inspects an intercepted outbound packet prior to the outbound packet reaching the data link layer in which the outbound packet would be prepared for routing.

The outbound packet is transmitted to a client application responsive to the filtering table (step 406). In some embodiments, a filter transmits the outbound packet to the client application, responsive to the filtering table. In one of these embodiments, when the filter inspects an outbound packet, the filter compares data in the outbound packet to data in the filtering table. In one embodiment, the filtering table indicates that an outbound packet should be transmitted to the client application if the outbound packet is addressed to a particular destination, such as a private network behind a gateway computing device. In another embodiment, the filtering table indicates that an outbound packet should be transmitted to the client application if the outbound packet is a particular type of packet, for example, a packet containing real-time data, such as voice or video data. In still another embodiment, the filtering table indicates that a packet should be transmitted to the client application if transmission of the outbound packet requires a particular protocol type. In one embodiment, the filter transmits the outbound packet to the client application responsive to a routing table. In another embodiment, the filter transmits the outbound packet to a port monitored by the client application. In some embodiments, the filter rewrites a destination address and a destination port of the packet. In one of these embodiments, the filter transmits the rewritten packet back up the network stack of the operating system for delivery to the client application. In another of these embodiments, the filter transmits information about the outbound packet to the client application prior to rewriting the destination address and destination port. The transmitted information may include the original destination address and destination port.

The client application determines to transmit the outbound packet to a gateway computing device, responsive to an application of a policy to the outbound packet (step 408). In one embodiment, the filtering table indicates to the filter that the outbound packet should be transmitted to the client application. In some embodiments, upon receipt of the outbound packet from the filter, the client application applies a policy to the outbound packet. In one of these embodiments, the client application determines whether to transmit the outbound packet to the gateway computing device responsive to the application of the policy. In one embodiment, the determination to transmit the outbound packet to the gateway computing device is based upon the type of application that generated the outbound packet. In another embodiment, the determination to transmit the outbound packet to the gateway computing device is based upon the type of data within the outbound packet. In still another embodiment, the determination to transmit the outbound packet to the gateway computing device is based upon a characteristic of a destination network to which the outbound packet is addressed.

In one embodiment, the client application authenticates the client computing device to a gateway computing device prior to transmission of the outbound packet. In another embodiment, the client application encrypts the outbound packet prior to transmitting the outbound packet to the gateway computing device. In still another embodiment, the client application establishes a secure sockets layer (SSL) tunnel to the gateway computing device. In yet another embodiment, the client application transmits an encrypted outbound packet to the gateway computing device via an SSL tunnel to the gateway computing device.

Figure 5:
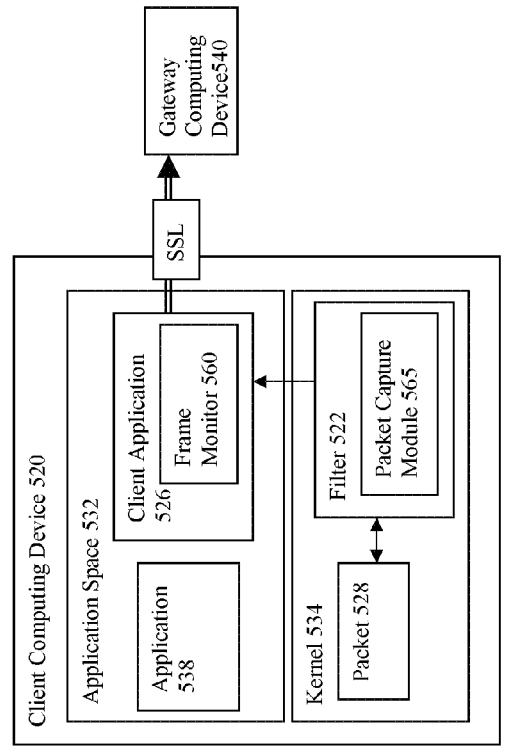
FIG. 5 is a block diagram depicting one embodiment of a system for routing a packet from a client computing device to a gateway.

Referring now to FIG. 5, a block diagram depicts one embodiment of a system for routing a packet from a client computing device to a gateway computing device. In brief overview, the system includes a client computing device 520 and a gateway computing device 540. The client computing device 520 includes an application space 532 and a kernel 534. The application space 532 includes a client application 526. The kernel space 534 includes a filter 522 and a packet 528. In one embodiment, the filter 522 and the client application 526 form a device for routing packets to a gateway computing device.

The kernel 534 may include a filter 522 and an outbound packet 528. The filter 522 may include a packet capture module 565. The packet capture module 565 may comply with the Network Driver Interface Specification (NDIS). The packet capture module 565 may operate in kernel mode. The packet capture module 565 may intercept outbound packet traffic. The packet capture module 565 may forward the packets to a frame monitor in an application 526.

In some embodiments, the filter 522 communicates with the client application 526 via asynchronous I/O control messages. In one of these embodiments, the packet capture module 565 may forward packets addressed to a private network behind a gateway computing device 540 via asynchronous I/O control messages. In other embodiments, the filter 522 communicates with the client application 526 running in the application space 534 via UDP packets. In one embodiment, the filter 522 receives configuration settings from the client application 526 driver via asynchronous I/O control messages. The configuration settings may include information regarding which networks, protocols, or types of packets to filter. In one embodiment, the filter 522 stores the configuration settings in a filtering table. In another embodiment, the filter 522 receives a filtering table including the configuration settings.

In one embodiment, the filter 522 intercepts all outbound packets 528 for inspection. If the packet 528 satisfies a condition listed in the filtering table, the filter 522 may transmit the packet 528 to the client application 526 and not to the original destination of the packet 528. The filter 522 may use an asynchronous I/O control message to forward the packet 528 to the client application 526. The filter 522 may transmit the packet 528 to the client application 526 responsive to a routing table.

The kernel 534 in the client computing device 520 may include an NDIS interface. In some embodiments, the NDIS interface includes a plurality of intermediate filters. In one embodiment, a packet 528 passes through the NDIS interface and may be inspected by the plurality of intermediate filters. The filter 522 may be provided as an NDIS driver. The filter 522 may also be a process executing on the kernel 534.

The application space 532 includes a client application 526. In one embodiment, the application space 532 may include an application 538, which may generate the packet 528. In some embodiments, an application 538 executing in application space 532 generates a packet 528 for transmission by the client computing device 520. The application 538 can be any type and/or form of application such as any type and/or form of web browser, web-based client, client-server application, a thin-client computing client, an ActiveX control, or a Java applet, or any other type and/or form of executable instructions capable of executing on client computing device 110 or communicating via a network. The application 538 can use any type of protocol and it can be, for example, an HTTP client, an FTP client, an Oscar client, or a Telnet client. In some embodiments, the application 538 uses a remote display or presentation level protocol. In one embodiment, the application 538 is an ICA client, developed by Citrix Systems, Inc. of Fort Lauderdale, Fla. In other embodiments, the application 538 includes a Remote Desktop (RDP) client, developed by Microsoft Corporation of Redmond, Wash. In other embodiments, the application 538 comprises any type of software related to Voice over IP (VOIP) communications, such as a soft IP telephone. In further embodiments, the application 538 comprises any application related to real-time data communications, such as applications for streaming video and/or audio.

The client application 526 may reside in application space 532 on a client computing device 520. In some embodiments, the client application 526 provides functionality for receiving packets from the filter 522. In other embodiments, the client application 526 provides functionality for applying a policy to a received packet 528. In still other embodiments, the client application 526 provides functionality for managing an SSL tunnel to the gateway computing device 540. In yet other embodiments, the client application 526 provides functionality for encrypting and transmitting a packet 528 to the gateway computing device 540.

The client application 526 may include frame monitor 560. The frame monitor 560 may include policies and logic for applying a policy to a received packet. The frame monitor 560 may apply a policy to a received packet 528. The client application 526 may transmit a packet to a gateway computing device 540 responsive to a policy-based determination made by the frame monitor 560.

In some embodiments, the frame monitor 560 may apply a policy to determine a state of the client computing device 520 at the time of transmission of the packet. In some embodiments, the policy applied may require satisfaction of a condition. In one of these embodiments, the policy may require that the client computing device 520 execute a particular operating system to satisfy the condition. In some embodiments, a policy may require that the client computing device 520 execute a particular operating system patch to satisfy the condition. In still other embodiments, a policy may require that the client computing device 520 provide a MAC address for each installed network card to satisfy the condition. In some embodiments, a policy may require that the client computing device 520 indicate membership in a particular Active Directory to satisfy the condition. In another embodiment, a policy may require that the client computing device 520 execute a virus scanner to satisfy the condition. In other embodiments, a policy may require that the client computing device 520 execute a personal firewall to satisfy the condition. In some embodiments, a policy may require that the client computing device 520 comprise a particular device type to satisfy the condition. In other embodiments, a policy may require that the client computing device 520 establish a particular type of network connection to satisfy the condition.

In other embodiments, the frame monitor 560 may identify an application 538 that generated the packet 528. In one of these embodiments, the frame monitor 560 may make a policy-based determination to transmit the packet 528 to the gateway computing device 540 responsive to the identified application 538. In another of these embodiments, the frame monitor 560 may perform a checksum on the packet to verify that the identified application actually generated the packet 528.

In one embodiment, the gateway computing device 540 is a remote access server. The gateway computing device 540 may decrypt packets received from the client computing device 520. The gateway computing device 540 may protect a private network. In some embodiments, the gateway computing device 540 associates a client computing device 520 with a private IP address. In one of these embodiments, when the gateway computing device 540 receives a packet from the client computing device 520, the gateway computing device 540 transforms the IP address of the packet to the IP address associated with the client computing device 520. The gateway computing device 540 may apply access control policies to a received packet prior to routing the packet to a final destination. The gateway computing device 540 is described in further detail below, in FIG. 11.

Once a frame enters the gateway computing device 540 via an SSL tunnel, the packet and its payload are dispatched via callbacks into a handlers executing in user mode, which provide functionality for SSL decryption. In one embodiment, OpenSSL is used. In another embodiment, a hardware accelerator is used. Once the packet is decrypted, it is injected into the HTTP stack where headers are assembled and passed on to the remote access blade.

In a remote access blade, a packet is classified by the type of data contained within the packet. In one embodiment, the packet contains an HTTP header requesting login and registration. In another embodiment, the packet seeks TCP/UDP/RAW/OTHER connection establishment. In still another embodiment, the packet contains connection-specific data. In yet another embodiment, the packet contains a special feature request such as collaboration with other users, fetching of user directory and presence or requesting telephony functionality such as conferencing and web cast. The remote access module dispatches the packet appropriately to the corresponding sub handler. For example, the client computing device may request that a connection be set up to a specific machine on the private network behind the gateway computing device. The remote access module may consult with the access control module and if a positive response is returned, the remote access module may grant the request. In some embodiments, the remote access module may grant the request by injecting subsequent frames on the private network using a frame forwarding module utilizing NAT/PAT to correlate incoming frames to corresponding SSL tunnels to the client computing device.

Figure 6:
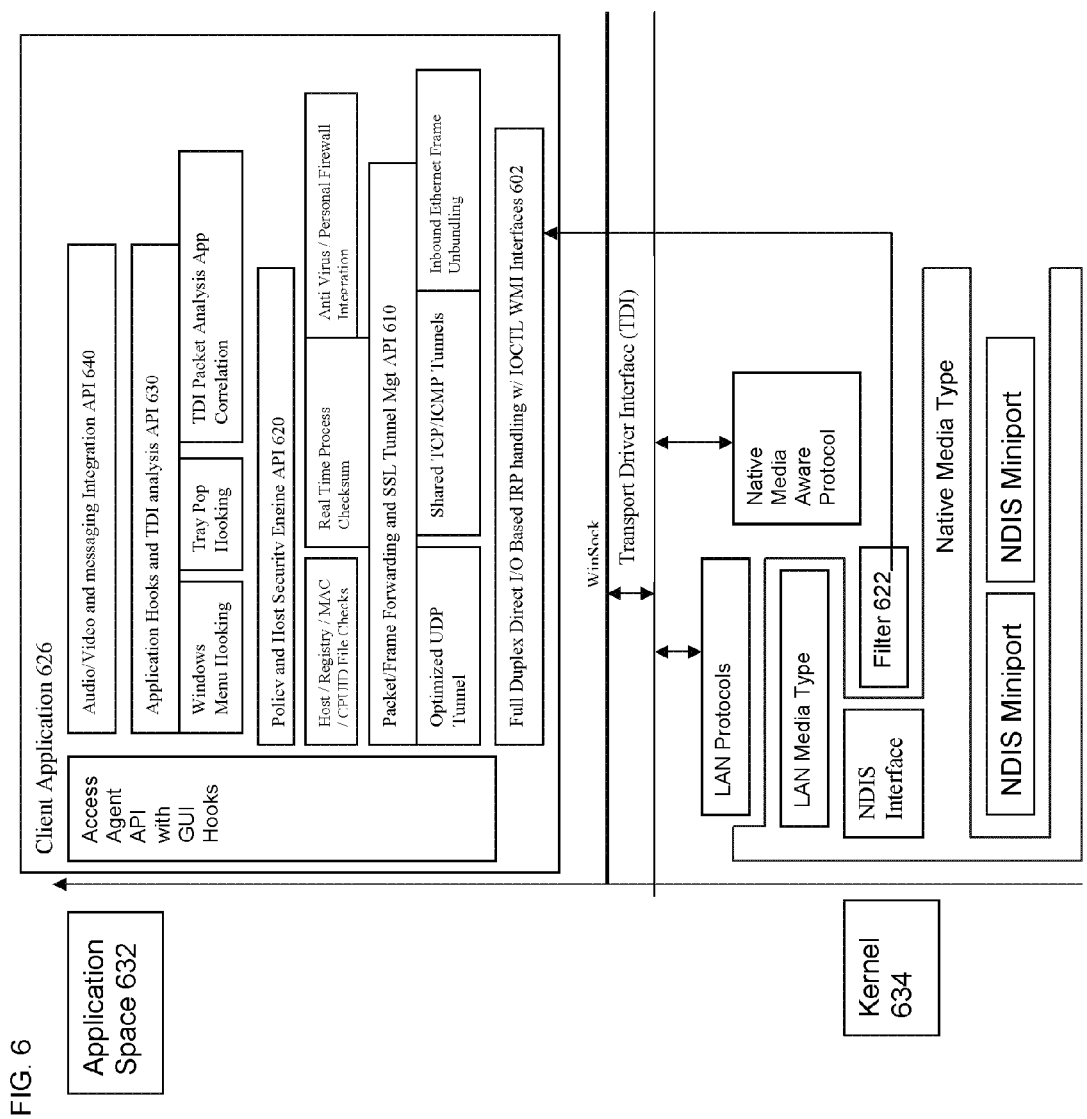
FIG. 6 is a block diagram depicting one embodiment of a client application transmitting a packet to a gateway responsive to applying a policy to the packet.

Referring now to FIG. 6, a block diagram depicts one embodiment of a client application transmitting a packet to a gateway computing device responsive to applying a policy to the packet.

The client application 526 in application space 532 receives a packet. In one embodiment, the client application 526 receives the packet from the filter 522. In some embodiments, an interface 602 on the client application 526 receives the packet. In one of these embodiments, the interface 602 is a full-duplex direct I/O-based IRP-handling interface with an I/O Control Windows Management Interface (WMI).

The client application 526 inspects the packet. In one embodiment, a policy and host security engine API 620 on the client application 526 inspects the packet. In one embodiment, the policy and host security engine API 620 applies a policy to the packet. The policy may include requirements for hosts and processes accessing a corporate network.

In some embodiments, the policy and host security engine API 620 identifies an application 538 that generated the packet. An application 538 may be continuously check-summed to ensure that malicious applications with the same name did not generate the packet. If the policy and host security engine API 620 determines that the current condition and history of the machine satisfies the applied policies, the client application 526 may transmit the packet to the gateway computing device 540.

In some embodiments, a packet/frame forwarding and SSL tunnel management API 610 on the client application 326 transmits the packet to a gateway computing device 540. The API 610 may transmit the packet across an SSL tunnel to the gateway computing device 540.

In one embodiment, the client application 526 establishes an asynchronous maintenance tunnel to communicate with a policy module on the gateway computing device 540. The client application 526 may use the tunnel to communicate with the gateway computing device 540 regarding client events (such as status of firewalls and anti-virus programs). The client application 526 may also use the tunnel to receive new policies from the gateway computing device.

In some embodiments, the client application 526 includes an Application Hook and TDI analysis API 630. The API 530 may use Windows menu hooking and tray pop hooking to inject GUI messages to an end user of the client computing device 520. In one embodiment, the GUI messages alert the end user of various system events, system administrator announcements and gather user credentials.

In other embodiments, the client application 526 includes an audio/video and messaging integration API 640. The API 640 may use audio, video and IM messaging hooks to interconnect with existing user applications (such as MSN messenger or an installed softphone).

Figure 7:
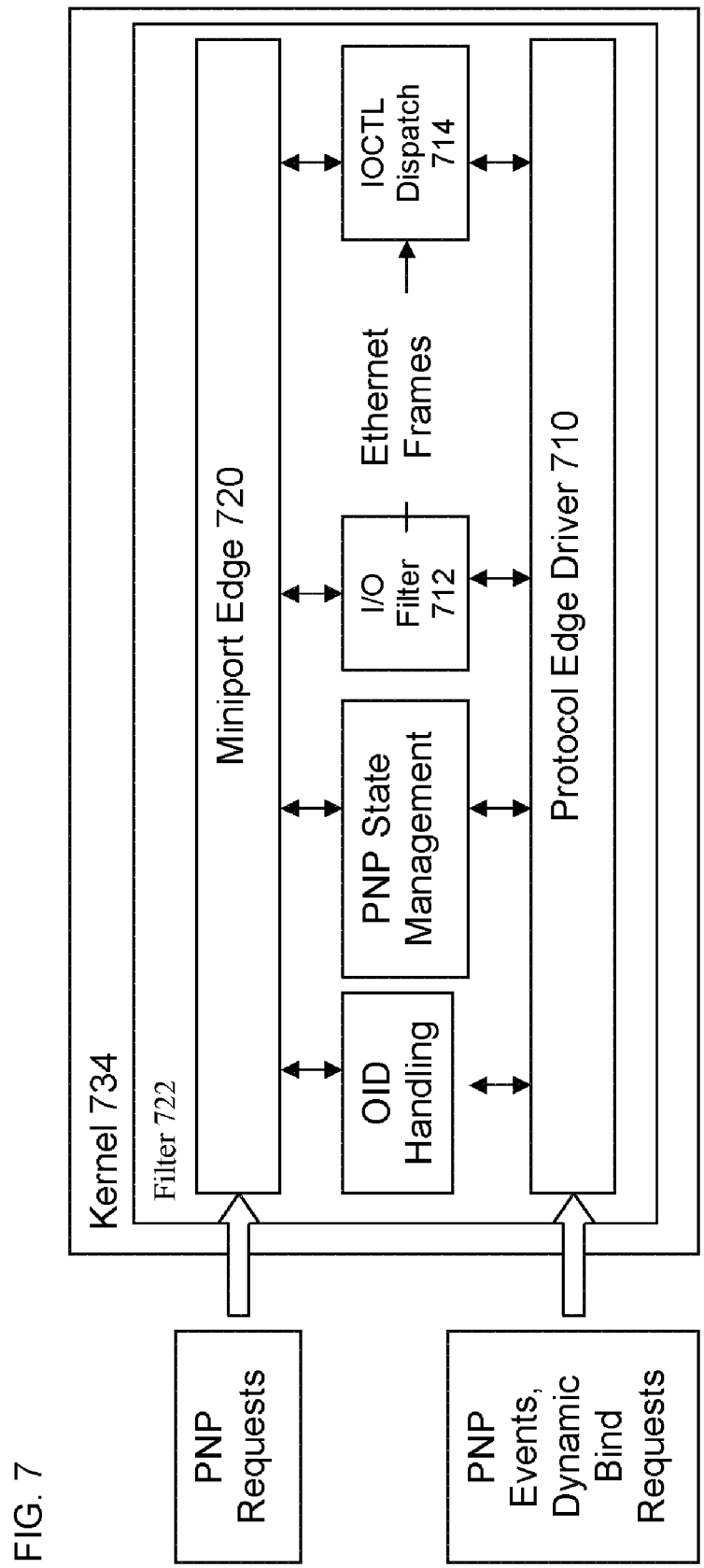
FIG. 7 is a block diagram depicting one embodiment of a filter intercepting a packet and transmitting the packet responsive to a filtering table.

Referring now to FIG. 7, a block diagram depicts one embodiment of a filter 522. In one embodiment, the filter 522 includes a protocol edge driver 710 and a miniport edge 720. The protocol edge driver 710 exposes a protocol layer to the underlying network drivers. The miniport edge 720 exposes a miniport interface to the upper layer protocol drivers.

Packets entering the protocol edge driver 710 on the receive path are arriving from other client computing devices that are using the client computing device 520 as a gateway computing device.

Packets entering the miniport edge 720 are arriving from applications 538 running on the client computing device 520 that are transmitting outbound packets to a private network behind a gateway computing device 540. The I/O filter 712 applies filtering logic on each packet and compares it against its filter table. If the I/O filter 712 filters the packet, the I/O filter 712 passes the packet to the IOCTL dispatch engine 714 with a request to forward the packet to the client application 526. Otherwise, the I/O filter 712 sends the packet to its original direction, either up or down the network stack as appropriate.

In some embodiments, the client application 326 is not located on the client computing device 320. In one of these embodiments, a peripheral device contains the client application 326.

Figure 8:
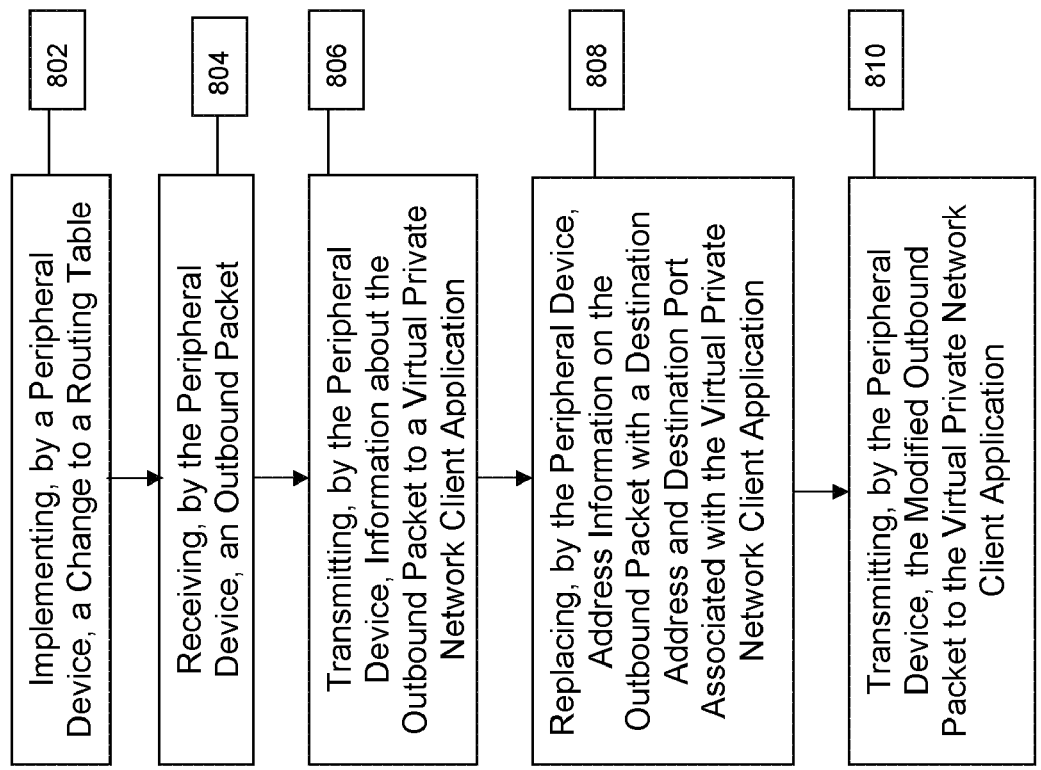
FIG. 8 is a flow diagram depicting one embodiment of the steps taken in a method for routing packets from a peripheral device to a virtual private network gateway.

Referring now to FIG. 8, a flow diagram depicts one embodiment of the steps taken in a method for routing packets from a peripheral device to a gateway computing device. In brief overview, the method includes the step of implementing, by a peripheral device, a change to a routing table (step 802). The peripheral device receives an outbound packet (step 804). The peripheral device transmits information about the outbound packet to a client application residing on the peripheral device (step 806). The peripheral device replaces address information on the outbound packet with a destination address and destination port associated with the client application (step 808). The peripheral device transmits the modified outbound packet to the client application (step 810).

Referring now to FIG. 8, and in greater detail, a peripheral device implements a change to a routing table (step 802). In some embodiments, the peripheral device retrieves a plurality of changes to make to the routing table. In one of these embodiments, the peripheral device may retrieve the changes from a VPN gateway computing device. In another of these embodiments, the VPN gateway computing device may require authentication of the peripheral device prior to the retrieval of routing table changes.

In one embodiment, the peripheral device stores a VPN application. Upon connection to a computer system, the peripheral device identifies itself to the client computing device as a mass storage device and executes the VPN application on the client computing device. In some embodiments, the VPN application authenticates the peripheral device to a VPN gateway computing device. In one of these embodiments, after authentication, the VPN application retrieves routing table changes from the VPN gateway computing device. In another of these embodiments, the VPN application creates a file on the peripheral device storing retrieved routing table changes. In still another of these embodiments, the VPN application retrieves data for use by the peripheral device. The data may include a destination address of the VPN gateway computing device, an IP address for the client computing device, and at least one port address for the VPN application to monitor.

In some embodiments, upon creation of a file on the peripheral device, the peripheral device identifies itself to the client computing device as a network device. In one of these embodiments, the peripheral device transfers to the client computing device a plurality of routing table changes stored in the created file. In another of these embodiments, the peripheral device instructs a computer through the transmitted routing table changes to transmit an outbound packet to the peripheral device. In still another of these embodiments, the change to the routing table indicates to the client computing device that all outbound packets not destined for the VPN application should be transmitted to the peripheral device. In some embodiments, an outbound packet is transmitted by the client computing device to the peripheral device, responsive to the change to the routing table.

The peripheral device receives an outbound packet (step 804). In one embodiment, the peripheral device receives the outbound packet responsive to the change made to the routing table. In one embodiment, the peripheral device receives the outbound packet by interacting with the peripheral side of R-NDIS, accepts the outbound packet, and indicates to R-NDIS that the packet has been delivered.

In one embodiment, when the peripheral device receives the outbound packet, the outbound packet includes an IP header storing a set of address information. In some embodiments, the peripheral device determines that the set of address information is unique. In one of these embodiments, when the peripheral device receives a unique set of address information, the peripheral device maps the unique set of address information to a unique source port. The peripheral device may generate a random number to create the unique source port. The peripheral device may store, in memory, the mapping from the unique set of address information to the unique source port.

In some embodiments, the peripheral device generates a second packet. In one of these embodiments, the peripheral device creates a data structure inside a control frame in a data section of the second packet. In another of these embodiments, the data structure includes the unique source port. In still another of these embodiments, the data structure stores an IP address of the client computing device. In yet another of these embodiments, the data structure stores one of a plurality of well-known destination ports monitored by the VPN application. In some embodiments, the data structure stores well-known destination ports and destination address retrieved from the VPN Gateway computing device.

The peripheral device transmits information about the outbound packet to a client application (step 806). In some embodiments, the peripheral device transmits the generated second packet to a VPN application. In one of these embodiments, the generated second packet includes the IP address of the client computing device and a destination port monitored by the VPN application. Including this information in the generated second packet enables the peripheral device to transmit the generated second packet and have the generated second packet delivered to the VPN application on a port monitored by the VPN application. In another of these embodiments, the generated second packet includes the unique source port generated by the peripheral device. In still another of these embodiments, the peripheral device indicates to the client computing device that the generated second packet is a new received packet and transmits the second packet to the client computing device. The client computing device receives the second packet and delivers it to the VPN application.

The peripheral device replaces address information on the outbound packet with a destination address and a destination port associated with the client application (step 808). Rewriting the address information enables the peripheral device to forward the outbound packet to a VPN application. In one embodiment, the peripheral device replaces the destination address on the outbound packet with the IP address of the client computing device on which the VPN application executes. In another embodiment, the peripheral device replaces the destination port on the outbound packet with a destination port monitored by the VPN application. In still another embodiment, the peripheral device replaces the source port on the outbound packet with the generated unique source port described above.

The peripheral device transmits the modified outbound packet to the VPN application (step 810). In some embodiments, the peripheral device indicates to the client computing device that the modified outbound packet is a newly received packet. In one of these embodiments, the client computing device receives the modified outbound packet, identifies the destination port as a port monitored by the VPN application, and transmits the modified outbound packet to the VPN application.

The peripheral device generates the second packet to provide the VPN application with the unique source port. Once the VPN application receives the unique source port, the VPN application may use the unique source port to identify an original destination address associated with other packets. In one embodiment, when the VPN application receives a new, modified outbound packet containing a source port, the VPN application uses the unique source port to retrieve the original destination address of the outbound packet from a mapping stored on the peripheral device.

In some embodiments, the VPN application transmits the outbound packet to the VPN gateway computing device. In one of these embodiments, the VPN application encrypts the modified outbound packet. In another of these embodiments, the VPN application transmits the outbound packet to the VPN gateway computing device, responsive to the information received about the outbound packet from the peripheral device. In still another of these embodiments, the VPN application employs a received unique source port to retrieve from the peripheral device a destination port and destination address associated with the unmodified outbound packet. The VPN application may then transmit the retrieved address information with the modified outbound packet to the VPN gateway computing device. In some embodiments, the VPN application makes a connection to the original destination address and then transmits the packet to the destination.

In one embodiment, the VPN application establishes an SSL tunnel to the VPN gateway computing device. The VPN application may transmit the outbound packet to the VPN gateway computing device across the SSL tunnel. In this embodiment, the VPN application may establish the SSL tunnel responsive to a destination address associated with the outbound packet received from the peripheral device.

In some embodiments, the firmware on the device enables several types of functionality. In one of these embodiments, the firmware reports the type of device as a composite USB mass storage and network device combination device. In another of these embodiments, the firmware stores and launches applications. These applications may include, without limitation, encryption and tunnel management logic, end user applications (such as email or soft phones), end user identity (such as certificates or tokens), autorun.inf files so applications are automatically launched, and end user application data (such as email pst files). In yet another of these embodiments, the firmware implements an R-NDIS loop back such that outbound IP packets that are sent to the peripheral device are identified to the client computing device as inbound IP packets and sent back to the host operating system to a different port. By marking an outbound packet as an inbound packet, the peripheral device can send the packet to the VPN application and prevent the packet from leaving the computer unencrypted. Forcing a packet to the VPN application, which sends the packet to a VPN gateway computing device for transmission to the original destination of the packet, also ensures that the packet is transmitted to the original destination in a secure manner.

In other embodiments, the firmware on the peripheral device implements token software such that unique tokens are generated on a timely basis in synchronization with the authenticating VPN gateway computing device. The peripheral device may establish an authentication tunnel with the VPN gateway computing device. The VPN gateway computing device can read tokens from a file stored in mass storage on the peripheral device. The host VPN tunnel logic may fetch the token and sent the token to the VPN gateway computing device as an authentication factor.

Figure 9:
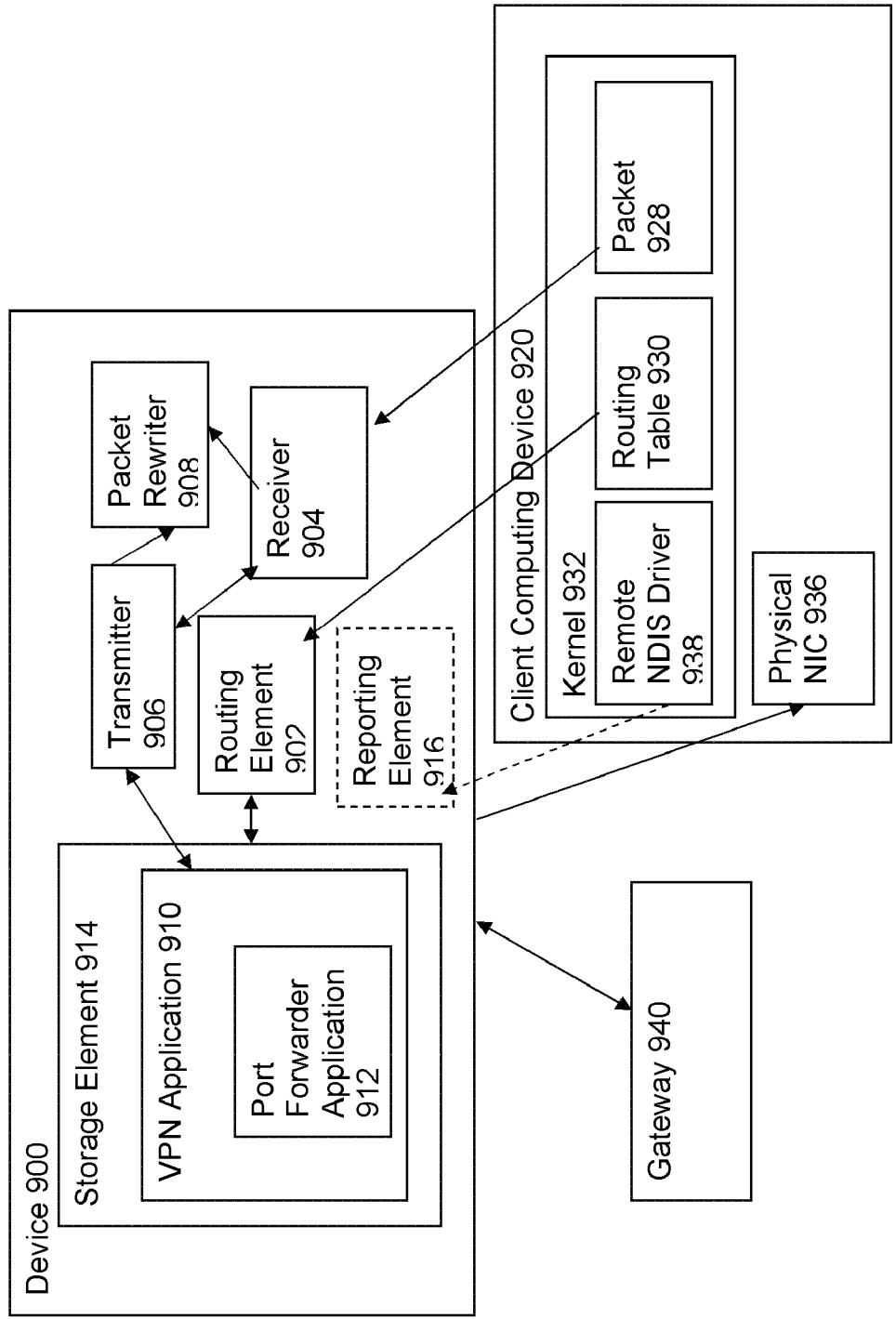
FIG. 9 is a block diagram depicting one embodiment of a system for routing packets to a gateway.

Referring now to FIG. 9, a block diagram depicts one embodiment of a system for routing packets to a gateway computing device, the system including a device 900 and a client computing device 920. In brief overview, the device 900 includes a routing element 902, a receiver 904, a transmitter 906, a packet rewriter 908, a VPN application 910, a port forwarder application 912, and a storage element 914. The client computing device 920 includes a kernel 932, a routing table 930, a packet 928, a physical network interface card (NIC) 936, and a remote-NDIS (R-NDIS) driver 938.

The client computing device 920 comprises a routing table 930, a packet 928, a physical NIC 936, and a remote-NDIS driver 938. In some embodiments, the client computing device 920 further comprises a device driver that enables communication between the client computing device 920 and the device 900. In one of these embodiments, the device driver may comprise a Remote-NDIS driver for Universal Serial Bus (USB) device.

In one embodiment, the device 900 connects to the physical NIC 936 on the client computing device 920. The physical NIC 936 may be a USB card. In other embodiments, the physical NIC 936 is an external bus supporting high data transfer rates and complying with the IEEE 1394 standard, such as a Firewire card. In other embodiments, the physical NIC 936 is a small computer system interface (SCSI) card.

Still referring to FIG. 9, the device 900, in communication with the client computing device 920, comprises a routing element 902, a receiver 904, a transmitter 906, a packet rewriter 908, a VPN application 910, and a storage element 914. In one embodiment, the device 900 is a peripheral device. In some embodiments, the device 900 is a Universal Serial Bus composite device capable of functioning as a mass storage device and as a network device. In one of these embodiments, the device 900 functions as a mass storage device because the device 900 includes the storage element 914. The storage element 914 may store applications to execute on the client computing device 920, such as the VPN application 910.

In one embodiment of the present invention, the device 900, which may be a USB peripheral device, operates as a composite USB device declaring itself as a device capable of mass storage. A reporting element 916, shown in shadow in FIG. 9, may be included on the device 900 and may identify the device 900 to the client computing device 920 as a mass storage device or as a network device by changing a removable media device setting, such as a flag contained within the SCSI Inquiry Data response to the SCSI Inquiry command. Bit 7 of byte 1 (indexed from 0) is the Removable Media Bit (RMB). A RMB set to zero indicates that the device is not a removable media device. A RMB of one indicates that the device is a removable media device. A mass storage section of the device 900, such as a storage element 914, may contain the files necessary for the host side of the remote access software to launch and run in the memory space of the host operating system without any installation on the client computing device 920. The device 900 may deploy software using a file such as autorun.inf that identifies for an operating system on the client computing device 920 what launcher files to execute.

In an embodiment where the device 900 has a composite nature, the device 900 may initially appear as a mass storage capable of removable media and use autostart.inf to launch a port forwarder application 912 on a VPN application 910. The port forwarder application 912 may show a login dialog to a user of the client computing device 920 and collect user credentials. In one embodiment, the port forward application 912 may establish an SSL tunnel with the VPN gateway computing device 940 and present the VPN gateway computing device 940 with authentication credentials, certificates, or tokens, each of which may be read from the mass storage section on the device 900.

For packets that are destined for a network on which the VPN gateway computing device 940 resides, the device 900 generates a unique source port number and maps the unique source port number to a destination address on the packet 928. The device 900 may then rewrite the packet 928, addressing the packet 928 to the destination address of the client computing device 920 and to a port on the client computing device 920 monitored by the port forwarder application 912, and including the unique source port number in the rewritten packet 928. The device 900 may transmit the rewritten packet 928 to the client computing device 920. The client computing device 920 transmits the rewritten packet 928 to the port monitored by the VPN application 910.

The device 900 may store applications, such as electronic mail applications, in the storage element 914, for execution on the client computing device 920. In some embodiments, the present invention enables sandboxing. In one of these embodiments, the device 900 hosts application data if the device 900 determines that mass storage on the client computing device 920 is not a safe asset for the storage of data generated and used during a VPN session. In another of these embodiments, the invention provides a mechanism enabling plugging a device 900 into any client computing device 920 and automatically having session data readily available. Additionally, storage of an application and execution data on a device 900 may prevent a user from leaving sensitive data on insecure client computing devices 920.

In other embodiments, if the device 900 determines that the client computing device 920 is insecure and should not receive access to the network on which the VPN gateway computing device 940 resides, the device 900 may serve as a platform for launching a remote frame buffer (or thin client) mode of operation to gain remote access. In one of these embodiments, the session state for the remote access can be saved on the device 900 and resumed from other locations. In still other embodiments, the device 900 may also serve as an audio device and provide soft phone functionality to the client computing device, where the telephony logic runs in the port forwarder application and the device simply serves as an I/O mechanism.

The routing element 902 implements a change to the routing table 930 on the client computing device 920. In one embodiment, the routing element 902 changes the routing table so that the client computing device 920 reroutes all outbound packets to the device 900. In another embodiment, the routing element 902 implements the change by transmitting a retrieved change to the client computing device after a reporting element 916, shown in shadow in FIG. 9, identifies the device 900 as a network device to the client computing device 920.

In some embodiments, the routing element 902 retrieves a plurality of changes to make to the routing table 930. In one of these embodiments, the routing element 902 may retrieve the changes from a VPN gateway computing device 940. In another of these embodiments, the VPN application 910 may retrieve the changes from the VPN gateway computing device 940. In still another of these embodiments, the VPN gateway computing device 940 may require authentication of the device 900 prior to the retrieval of routing table changes.

In some embodiments, the routing element 902 retrieves the change from the storage element 914. In one of these embodiments, the routing element 902 retrieves the change after the VPN application 910 has stored the change on the storage element 914.

In an embodiment where the device 900 includes a reporting element 916, the reporting element 916 may communicate with the client computing device 920 to identify the device 900 to the client computing device 920. In some embodiments, the reporting element 916 communicates with an R-NDIS driver 938. In one embodiment, the reporting element 916 identifies the device 900 as a mass storage device. The reporting element 916 may make this identification when the device 900 is initially connected to the client computing device.

In some embodiments, the reporting element 916 identifies the device 900 as a network device. In one of these embodiments, the reporting element 916 makes the identification after changes to the routing table 930 are retrieved and stored in the storage element 914. In another of these embodiments, the routing element 902 transfers to the client computing device 920 the retrieved routing table changes after the reporting element 916 identifies the device 900 to the client computing device 920 as a network device. In still another of these embodiments, the client computing device 920 implements the routing table changes as if the device 900 were a conventional network device.

The receiver 904 receives a packet from the client computing device 920. In one embodiment, the receiver 904 receives the outbound packet responsive to the change made to the routing table 930 by the routing element 902.

The transmitter 906, in communication with the receiver 904 and the packet rewriter 908, transmits information about the outbound packet to the VPN application 910. In one embodiment, the information comprises a unique source port generated by the packet rewriter 908 and associated with the outbound packet 920. In another embodiment, the information comprises a mapping between the unique source port of the outbound packet and the destination address of the outbound packet. In still another embodiment, the transmitter 906 transmits a rewritten outbound packet to the VPN application 910. In yet another embodiment, the transmitter 906 transmits a second packet generated by the peripheral device to the client computing device 920 for delivery to a port monitored by the VPN application 910.

The packet rewriter 908, in communication with the receiver 904 and the transmitter 906, rewrites address information on the outbound packet 928. In some embodiments, the packet rewriter 908 rewrites a destination address on the outbound packet 928 with a destination address and a destination port associated with the VPN application 910. In one embodiment, rewriting the destination address and the destination port enables transmission of the outbound packet to the VPN application 910. In some embodiments, the packet rewriter 908 generates a mapping table associating information in the outbound packet 928 with information in the modified outbound packet 928. In one embodiment, the mapping table associates a destination address and a destination port in the outbound packet 928 with the unique source port stored in the modified outbound packet 928. In another of these embodiments, the mapping table may contain information including an original source address, an original source port, an original destination address, an original destination port, and a unique mapping key used as the source port on rewritten packets.

In one embodiment, the packet rewriter 908, in communication with the receiver 904 and the transmitter 906, generates a second packet as described above in FIG. 8. In another embodiment, the packet rewriter 908 generates a unique source port as described above in FIG. 8.

The packet rewriter 908 replaces a destination address and a destination port on the outbound packet 920 with a destination address and destination port associated with the VPN application 910. In one embodiment, the packet rewriter 908 rewrites the destination address on the outbound packet 928 with an IP address of the client computing device 920 on which the VPN application 910 executes. In another embodiment, the packet rewriter 908 rewrites the destination port on the outbound packet 928 with a port monitored by the VPN application 910.

In some embodiments, the device 900 includes a VPN application 910, which may include a port forwarder application 912. In one of these embodiments, the VPN application 910 is stored in the storage element 914. In another of these embodiments, although the VPN application 410 is stored on the device 900, it executes on the client computing device 920. In this embodiment, the VPN application 910 provides secure transmission of a packet 928 without requiring a software installation on the client computing device 920.

In some embodiments, the VPN application 910 receives the rewritten outbound packet 928 from the client computing device 920. In one of these embodiments, the VPN application 910 uses a unique source address on the rewritten outbound packet 928 to obtain an original destination address. The VPN application 910 may consult a mapping table stored on the storage element 914 on the device 900 to correlate the unique source address on the outbound packet 928 with the original destination address. In another of these embodiments, the VPN application 910 transmits the outbound packet 928 and the original destination address to the VPN gateway computing device 940. In still another of these embodiments, the VPN gateway computing device 940 receives the outbound packet 928 and the original destination address from the VPN application 910 and forwards the outbound packet 920 to the original destination address.

In some embodiments, a port forwarder application 912 provides the functionality of the VPN application 910. In one of these embodiments, the port forwarder application 912 retrieves the changes to the routing table 930 from the VPN gateway computing device 940. In another of these embodiments, the port forwarder application 912 authenticates the device 900 to the VPN gateway computing device 940. In still another of these embodiments, the port forwarder application 912 stores the changes to the routing table 930 in the storage element 914. In yet another of these embodiments, the port forwarder application 912 uses a unique source port to determine the original destination address of the outbound packet 928 and forward the original destination address and the rewritten outbound packet 928 to the VPN gateway computing device 940.

In one embodiment, the port forwarder application 912 obtains routing rules after presenting the VPN gateway computing device 940 with authentication credentials. The device 900 obtains routing rules from the port forwarder application 912. In some embodiments, the port forwarder application 912 stores the routing rules on the storage element 914.

Once the VPN tunnel is established and routing information for the network on which the VPN gateway computing device 940 resides is retrieved from the VPN gateway computing device 940, the VPN application 910 may create a file on the storage element 914 of the mass media device. In one embodiment, the file contains the retrieved routing information. Creation of the file may indicate to the reporting element 916 that it should identify the device 900 to the client computing device 920 as an R-NDIS-capable USB device connected to the client computing device 920. At this point, the operating system on the client computing device 920 will negotiate (via R-NDIS) a DHCP IP address from the device 900 and adjust its routing tables based on information given to it from the device 900, which may be derived from the file created by the port forwarder application 912.

The device 900 may communicate with the port forwarder application 912 on the VPN application 910 using IP packets encapsulated in R-NDIS. The device 900 may also send status packets to the port forwarder application 912. These status packets may convey information regarding state and data structures stored by the device 900.

In some embodiments, to communicate with the port forwarder application 912, the device 900 transmits packets to a control port and unique IP address associated with the port forwarder application 912. In one of these embodiments, the device 900 transmits a packet including a unique source port, indicating to the port forwarder application 912 that the device 900 has received a packet with a unique destination address and that the device 900 generated the unique source port to map to the unique destination address. In another of these embodiments, the device 900 transmits a packet indicating to the port forwarder application 912 that the device 900 has removed a mapping between a unique source port and a unique destination address. In still another of these embodiments, the device 900 transmits a packet requesting from the port forward application 912 instructions for responding to a request, such as an Address Resolution Protocol request.

In other embodiments, the port forwarder application 912 transmits a communications packet to the device 900. In one of these embodiments, the port forwarder application 912 transmits to the device 900 a packet indicating that the port forwarder application 912 has successfully opened a connection to the VPN gateway computing device 940. In another of these embodiments, the port forwarder application 912 transmits to the device 900 a packet indicating that the port forwarder application 912 failed to open a connection to the VPN gateway computing device 940.

In some embodiments, the port forwarder application 912 listens for packets on a plurality of ports, including the following: UDP Traffic Port, TCP Traffic Port, ICMP Traffic Port, and the Control Port. When the port forwarder application 912 receives a packet from a traffic port, such as the UDP traffic port or the TCP traffic port, the port forwarder application 912 uses the unique source port number in the rewritten packet 928 to identify an original destination address. The port forwarder application 912 may then transmit the rewritten packet 928 with the original destination to the VPN gateway computing device 940. In one embodiment, the port forwarder application 912 transmits the rewritten packet 928 with the original destination to the VPN gateway computing device 940 across an SSL VPN tunnel. In another embodiment, the port forwarder application 912 encrypts the rewritten packet 928 prior to transmission.

In some embodiments, the port forwarder application 912 receives a packet from the VPN gateway computing device 940. In one of these embodiments, the port forwarder application transmits the packet to a port monitored by the device 900. The device 900 may transmit the received packet to the client computing device 920 for routing the packet to a user application.

In some embodiments, a gateway computing device protects a private network by securing a packet transmitted from the private network to a client computing device remotely accessing the private network. To minimize security threats to the private network, the gateway computing device may intercept, inspect, and secure packet traffic sent from a protected system on the private network to the client computing device. In one of these embodiments, the gateway computing device is a virtual VPN gateway computing device using NAT to masquerade the IP addresses of the protected system and of the private network. A NAT-enabled VPN gateway computing device may monitor and secure packet traffic permitting more secure transmission of traffic to dynamic ports on a client computing device from the private network. The VPN gateway computing device may monitor network traffic for packet traffic originating from secured resources and addressed to the client computing device. When this VPN gateway computing device identifies this traffic, the VPN gateway computing device may secure the packets for transmission to the client computing device.

Figure 10:
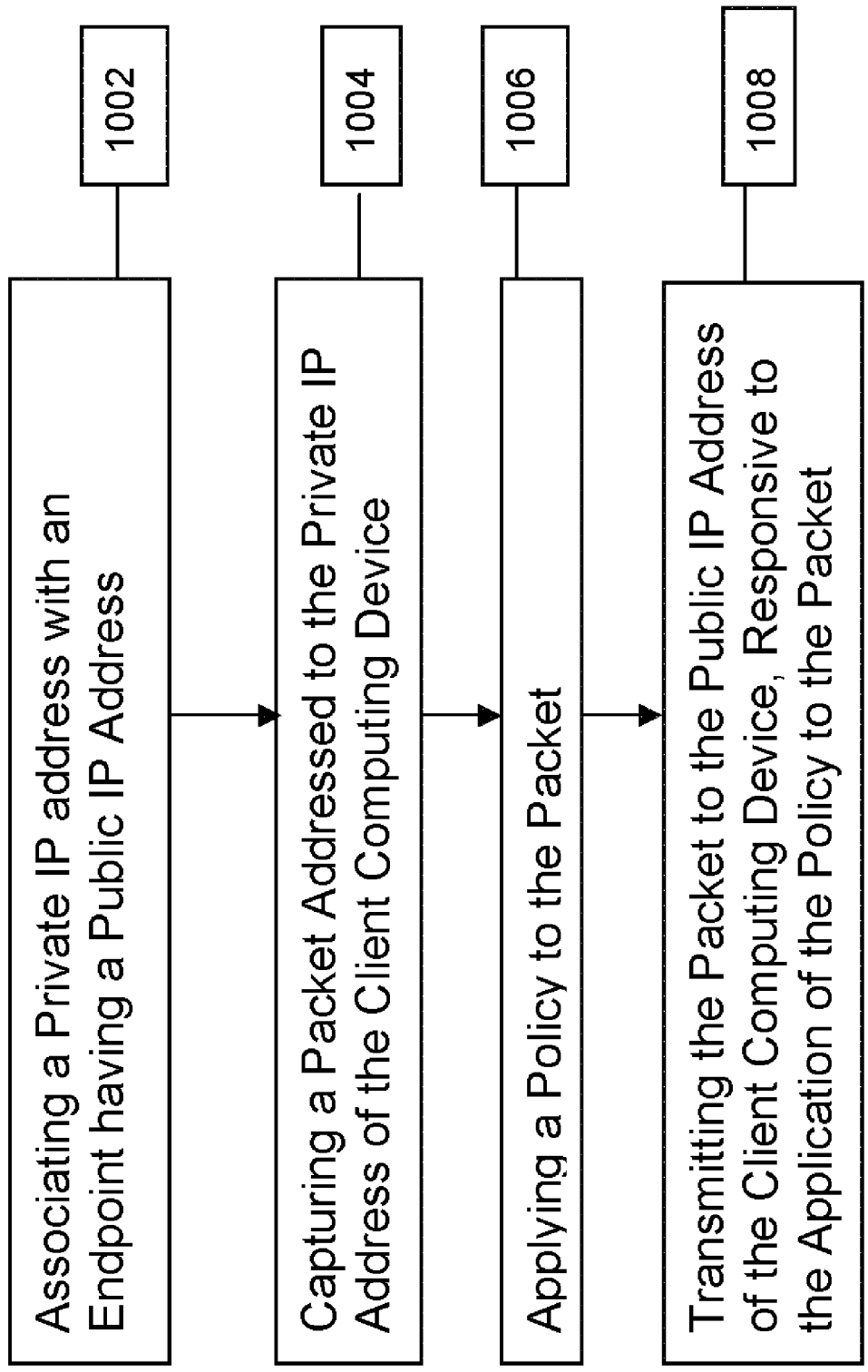
FIG. 10 is a flow diagram depicting one embodiment of the steps taken in a method for routing packets from a gateway to a client computing device.

Referring now to FIG. 10, a flow diagram depicts one embodiment of the steps taken in a method for routing packets from a gateway computing device to a client computing device. In brief overview, a private IP address is associated with a client computing device having a public IP address (step 1002). A packet addressed to the private IP address of the client computing device is captured (step 1004). A policy is applied to the packet (step 1006). The packet is transmitted to the public IP address of the client computing device, responsive to the application of the policy to the packet (step 1008).

A private IP address is associated with a client computing device having a public IP address (step 1002). In some embodiments, each connecting client computing device is assigned a private IP address. In one of these embodiments, the private IP address is not available to the client computing device, for security purposes. Since the client computing device does not have the private IP address, if the client computing device is compromised, the private network is still protected. In another of these embodiments, the private IP address is an address in a private network behind the gateway computing device. In some embodiments, associating a private IP address with a client computing device minimizes security risks to the private network behind the gateway computing device.

A packet addressed to the private IP address of the client computing device is captured (step 1004). In one embodiment, an application generates a packet for transmission to the client computing device. In some embodiments, the application executes on the gateway computing device. In other embodiments, the application executes on a machine residing on a private network behind the gateway computing device. In one embodiment, before the packet is routed to the client computing device, the packet is captured.

In some embodiments, a packet on a client computing device is captured by an application executing in kernel mode, such as an NDIS driver or filter. In one of these embodiments, the application executing in kernel mode forwards the packet to an application executing in user mode. Capturing a packet at kernel level, but transmitting the packet from user mode provides the ability to apply higher-level access control on the traffic to ensure that the application that created the packet satisfies security policies of the network to which the packet is transmitted.

In some embodiments, a filter on the gateway computing device captures a layer-2 Ethernet MAC frame transmitted to the gateway computing device from a client computing device. In one of these embodiments, a client computing device client application executing in user mode does not modify a routing table on the client computing device. Instead, a filter driver on the client computing device captures traffic below the network level, at the media access control (MAC) layer. The client computing device filter driver may capture and transmit a layer-2 Ethernet MAC frame intact to the gateway computing device, over a secure SSL VPN tunnel. In these embodiments, the filter on the gateway computing device provides functionality for capturing the Ethernet MAC frames in addition to capturing packets.

In some embodiments, the packet is inspected after it is captured. In one of these embodiments, the destination address of the packet is inspected. If the destination address is a private IP address associated with the client computing device, the packet may be redirected to a gateway computing device application executing in user mode on the gateway computing device.

A policy is applied to the packet (step 1006). In one embodiment, a management process applies the policy to the packet. In another embodiment, a policy engine applies the policy to the packet. The policy applied may require performance of a series of security checks, such as Access Control List matching and Deep Packet Inspection, on the received packet.

The packet is transmitted to the public IP address of the client computing device, responsive to the application of the policy to the packet (step 1008). After a packet has satisfied a policy, the gateway computing device may determine to transmit the packet to the client computing device. In one embodiment, the packet is re-associated with the original source address of the application generating the packet. The packet is forwarded to the client computing device. In some embodiments, the packets are transmitted over a secure SSL socket to the client computing device.

Figure 11:
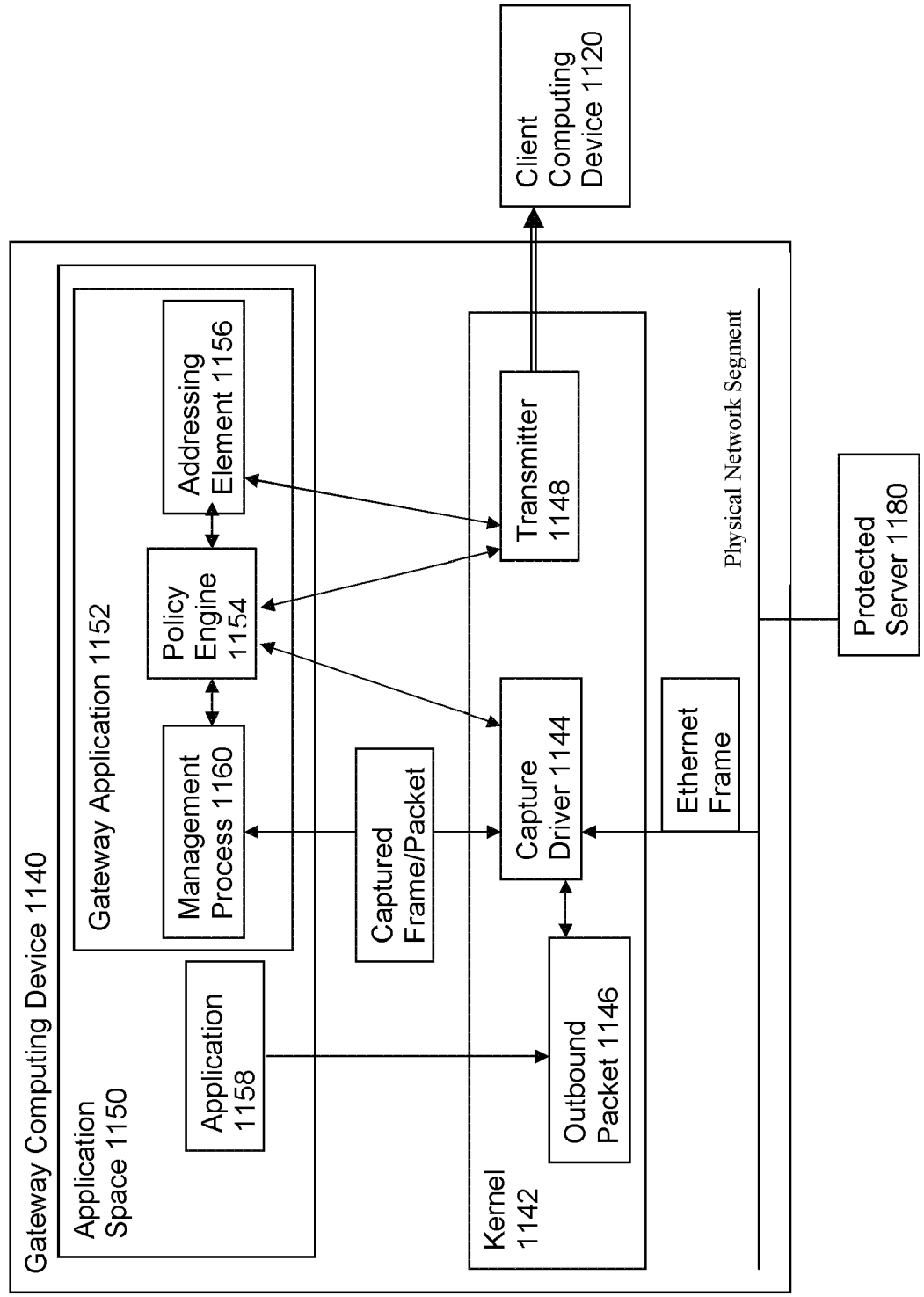
FIG. 11 is a block diagram depicting one embodiment of a gateway.

Referring now to FIG. 11, a block diagram depicts one embodiment of a gateway computing device. In brief overview, the gateway computing device 1140 includes a kernel space 1142 and an application space 1150. The kernel 1142 includes a capture driver 1144 and a transmitter 1148. The kernel 1142 may include an outbound packet 1146. The application space 1150 includes a gateway computing device application 1152, which includes a policy engine 1154, an addressing element 1156, and a management process 1160. The application space 1150 may include an application 1158.

The gateway computing device 1140 includes a capture driver 1144 executing in the kernel 1142. In some embodiments, an operating system on the gateway computing device 1140 does not readily allow the interception of incoming RAW IP Layer packets. In one of these embodiments, the capture driver 1144, operating in kernel mode on the gateway computing device 1140, captures all Ethernet packets destined for remote client computing devices and forwards the packets back to the management process 1160 operating in user mode on the gateway computing device 1140.

In some embodiments, a protected server 1180, residing on the private network behind the gateway computing device 1140, generates a packet for transmission to the client computing device 1120. In one of these embodiments, the protected server 1180 transmits the packet to the gateway computing device for the gateway computing device for transmission to the client computing device. In another of these embodiments, the generated packet is transmitted as an Ethernet frame. In this embodiment, the capture driver 1144 may capture the Ethernet frame when the Ethernet frame arrives at the gateway computing device 1140. In an embodiment where the capture driver 1144 captures an Ethernet frame, the capture driver 1144 forwards the Ethernet frame to the gateway computing device application 1152 as a frame, not as a packet.

In some embodiments, the capture driver 1144 receives a request from the gateway computing device application 1152 for notification of any packet received with a destination address of the private IP address associated with the client computing device 1120. In one of these embodiments, the capture driver 1144 forwards any Ethernet frame that arrives to the gateway computing device application 1152 over an appropriate raw IP socket. Any reply packets arriving from the client computing device 1120 (even if for a port chosen dynamically by the client computing device 1120, which is typical of active protocols such as active FTP and SIP), are captured by the capture driver 1144 and forwarded to the management process 1160 in the gateway computing device application 1152, which manages the SSL tunnel between the gateway computing device 1140 and that particular client computing device 1120.

In some embodiments, the capture driver 1144 inspects all outbound network frames prior to routing. In one of these embodiments, an outbound network frame is a frame transmitted to the gateway computing device 1140 by a protected server 1180 for forwarding to the client computing device 1120. In another of these embodiments, an application 1158 on the gateway computing device 1140 generates an outbound network frame for transmission to the client computing device 1120. By inspecting all packets prior to routing, the capture driver 1144 increases security and performance, and minimizes the risk of conflicting entries in an operating system routing table. Inspecting packets prior to routing also increases the ability to control packet flow, without the intervention of the underlying network operating system. Since the capture driver 1144 inspects, and potentially filters, all packets prior to routing, a forwarding decision can be made without use of the routing table.

The gateway computing device 1140 includes application space 1150, on which applications execute, and a gateway computing device application 1152. In one embodiment, the gateway computing device application 1152 operates in user mode on the application space 1150. In some embodiments, the gateway computing device application 1152 includes a policy engine 1154, an addressing element 1156 and a management process 1160.

In one embodiment, the management process 1160 manages the capture driver 1144. In another embodiment, the management process 1160 receives a captured frame or a captured packet from the capture driver 1144. In some embodiments, the management process 1160 applies a policy to the packet. In other embodiments, the management process 1160 forwards the captured packet or frame to the policy engine 1154 for packet inspection and policy application.

In one embodiment, when a client computing device 1120 connects to the gateway computing device 1140 the gateway computing device 1140 creates a plurality of raw IP sockets for UDP, IP and other protocols such as ICMP. The management process 1160 may request notification from a capture driver 1144 when a packet arrives on the gateway computing device 1140 from a protected server 1180 addressed to a client computing device 1120. When the capture driver 1144 captures the packet, the capture driver 1144 may transmit the packet to one of the plurality of sockets.

In one embodiment, the policy engine 1154 inspects a captured packet or captured frame. In another embodiment, the policy engine 1154 applies a policy to the captured packet or captured frame. In some embodiments, the policy is an access control policy. In other embodiments, application of the policy determines whether the packet originated from a trusted source, such as a protected server 1180. In some embodiments, the policy engine 1154 transmits a configuration setting to the capture driver 1144.

In one embodiment, the gateway computing device application 1152 includes an addressing element 1156. The addressing element 1156 may associate a private IP address with a client computing device 1120. In one embodiment, the private IP address provides the client computing device 1120 with an address on a private network behind the gateway computing device 1140.

In some embodiments, the addressing element 1156 provides functionality for network address translation. In one of these embodiments, the addressing element 1156 transforms a private IP address to a public IP address. This type of transformation may occur on a packet prior to transmission of the packet from a protected server 1180 to a client computing device 1120, after the policy engine 1154 has approved the packet for transmission to the client computing device 1120.

In other embodiments, when a client computing device 1120 transmits a packet to the gateway computing device 1140, the addressing element 1156 enables transformation of the source address on the packet from the public IP address associated with the client computing device 1120 to the private IP address associated with the client computing device 1120. In one of these embodiments, the transformation occurs because the client computing device is not aware of its associated private IP address.

After the policy engine 1154 has applied a policy to a captured packet, the policy engine 1154 may determine that the packet may be transmitted to its original destination. In one embodiment, the policy engine 1154 forwards the packet to the transmitter 1148 for transmission to the client computing device 1120. In another embodiment, the transmitter 1148 first performs a network address translation on the packet. In some embodiments, the transmitter 1148 performs the network address translation. In one of these embodiments, the transmitter 1148 forwards the packet to the addressing element 1156 for transformation of the private IP address to the public IP address of the client computing device. In another of these embodiments, the transmitter 1148 completes the network address translation.

In one embodiment, the capture driver 1144 provides the functionality of the transmitter 1148. In another embodiment, the network address translation occurs in the gateway computing device application 1152 first and then the packet is forwarded to the capture driver 1144 for transmission to the client computing device 1120.

After the transmitter 1148 transmits the packet to the client computing device 1120, the client application 326 receives the packet from the gateway computing device 1140 and forwards the packet to the filter 322, using an I/O control message. The filter 322 then marks the packet as an incoming packet and forwards the packet to the destination application via the network stack.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed as new and desired to be protected by Letters Patent of the United States is:

1. A method for routing packets from a computer peripheral device to a Virtual Private Network (VPN) gateway, the method comprising:
   (a) changing, by a computer peripheral device physically attached to and removable from a client computing device accessing a server via a VPN gateway, a routing table stored on the client computing device to instruct the client computing device to transmit an outbound packet to the computer peripheral device, the change received from the VPN gateway by a VPN client application program responsive to authenticating the computer peripheral device to the VPN gateway, the VPN client application program stored on the computer peripheral device and executing on a processor of the client computing device;
   (b) receiving, by a receiver of the computer peripheral device, the outbound packet from the client computing device responsive to the change in the routing table;
   (c) transmitting, by a transmitter on the computer peripheral device, information about the outbound packet to the VPN client application program, the VPN client application program establishing a secure communications tunnel with the VPN gateway;
   (d) rewriting, by a packet rewriter on the computer peripheral device, address information on the outbound packet; and
   (e) transmitting, by the transmitter on the computer peripheral device, the rewritten outbound packet to the VPN client application program to route to the VPN gateway.

2. The method of claim 1, wherein step (a) further comprises retrieving a plurality of changes to make to the routing table from a VPN gateway.

3. The method of claim 2, wherein step (a) further comprises authentication of the computer peripheral device to the VPN gateway.

4. The method of claim 1, further comprising the step of encrypting, by the VPN client application program, the rewritten outbound packet.

5. The method of claim 1, wherein step (a) further comprises transmitting, by the client computing device, the outbound packet to the computer peripheral device, responsive to the change to the routing table.

6. The method of claim 1, wherein step (a) further comprises storing, on the computer peripheral device, a plurality of changes to make to the routing table.

7. The method of claim 1, wherein step (c) further comprises transmitting, by the transmitter of the computer peripheral device, information comprising a unique source port to the VPN client application program.

8. The method of claim 1, wherein step (d) further comprises rewriting, by the packet rewriter of the computer peripheral device, a destination address on the outbound packet with a destination address and destination port associated with the VPN client application program.

9. The method of claim 1, wherein step (d) further comprises rewriting, by the computer peripheral device, a source port on the outbound packet with a unique source port.

10. The method of claim 1, wherein step (e) further comprises transmitting, by the transmitter of the computer peripheral device, the rewritten outbound packet to a port monitored by the VPN client application program.

11. The method of claim 1, further comprising the step of establishing, by the computer peripheral device, a secure sockets layer (SSL) tunnel to the VPN gateway.

12. The method of claim 1, further comprising the step of transmitting, by the VPN client application program, an encrypted outbound packet, responsive to the information received about the outbound packet.

13. The method of claim 1, further comprising the step of establishing, by the VPN client application program, a secure sockets layer (SSL) tunnel to the VPN gateway, responsive to a destination address associated with the outbound packet received from the computer peripheral device.

14. The method of claim 1, further comprising the step of transmitting an encrypted outbound packet to the VPN gateway across a secure sockets layer (SSL) tunnel.

15. A computer peripheral device for routing packets to a virtual private network (VPN) gateway, the computer peripheral device physically attached to and removable from a client computing device accessing a server via the VPN gateway, comprising:
   a routing element changing a routing table stored on the client computing device to instruct the client computing device to transmit an outbound packet to the computer peripheral device, the change received from the VPN gateway by a VPN client application program responsive to authenticating the computer peripheral device to the VPN gateway, the VPN client application program stored on the computer peripheral device and executing on a processor of the client computing device;
   a receiver receiving the outbound packet from the client computing device responsive to the change in the routing table;
   a transmitter, in communication with the receiver, transmitting information about the outbound packet to the VPN client application program, the VPN client application program establishing a secure communications tunnel with the VPN gateway; and
   a packet rewriter, in communication with the receiver and the transmitter, rewriting an address information on the outbound packet, the transmitter transmitting the rewritten outbound packet to the VPN client application program to route to the VPN gateway.

16. The computer peripheral device of claim 15 wherein the VPN client application program resides on the computer peripheral device and executes on the client computing device.

17. The computer peripheral device of claim 15, wherein the VPN client application program transmits the rewritten outbound packet to the VPN gateway.

18. The computer peripheral device of claim 15, wherein the packet rewriter generates a mapping table, the mapping table associating information in the outbound packet with information in the rewritten outbound packet.

19. The computer peripheral device of claim 15, wherein the packet rewriter generates a unique source port to replace a source port on the outbound packet.

20. The computer peripheral device of claim 15, wherein the packet rewriter replaces a destination address and a destination port on the outbound packet with a destination address and destination port associated with the VPN client application program.

21. A system for routing packets to a virtual private network (VPN) gateway, the system comprising:
a client computing device receiving at least one outbound packet and storing a routing table; and
a computer peripheral device, physically attached to and removable from the client computing device accessing a server via the VPN gateway, comprising:
a routing element changing the routing table to instruct the client computing device to transmit an outbound packet to the computer peripheral device, the change received from the VPN gateway by a VPN client application program responsive to authenticating the computer peripheral device to the VPN gateway, the VPN client application program stored on the computer peripheral device and executing on a processor of the client computing device;
a receiver receiving the at least one outbound packet from the client computing device responsive to the change in the routing table;
a transmitter transmitting information about the at least one outbound packet to the VPN client application program, the VPN client application program establishing a secure communications tunnel with the VPN gateway; and
a packet rewriter, in communication with the receiver and the transmitter, the packet rewriter replacing address information on the outbound packet with a destination address and a destination port associated with the VPN client application, the transmitter transmitting the rewritten outbound packet to the VPN client application program to route to the VPN gateway.

22. The system of claim 21, wherein the VPN client application program resides on the computer peripheral device.

23. The system of claim 21, wherein the VPN client application program executes on the client computing device.

24. The system of claim 21, wherein the computer peripheral device comprises a universal serial bus (USB) key storage device.

25. The system of claim 21, wherein the computer peripheral device further comprises a reporting element, the reporting element identifying the computer peripheral device to the client computing device as a mass storage device.

26. The system of claim 21, wherein the computer peripheral device further comprises a reporting element, the reporting element identifying the computer peripheral device to the client computing device as a networking device.

27. The system of claim 21, wherein the client computing device further comprises a device driver, the device driver enabling communication with the computer peripheral device.

28. The system of claim 27, wherein the device driver comprises a Remote-Network Driver Interface Specification driver for universal serial bus (USB) devices.

29. The computer peripheral device of claim 15, wherein the computer peripheral device comprises a Universal Serial Bus (USB) that is physically attached to and removable from a bus of the client computing device.

30. The system of claim 21, wherein the computer peripheral device comprises a Universal Serial Bus (USB) that is physically attached to and removable from a bus of the client computing device.

31. A method for routing packets from a universal serial bus (USB) device to a Virtual Private Network (VPN) gateway, the method comprising:
(a) changing, by a USB device physically attached to and removable from a client computing device accessing a server via a VPN gateway, a routing table stored in memory on the client computing device to instruct the client computing device to transmit an outbound packet to the computer peripheral device, the change received from the VPN gateway by a VPN client application program responsive to authenticating the computer peripheral device to the VPN gateway, the VPN client application program stored on the computer peripheral device and executing on a processor of the client computing device;
(b) receiving, by a receiver of the USB device, the outbound packet from the client computing device responsive to the change in the routing table;
(c) transmitting, by a transmitter on the USB device, information about the outbound packet to the VPN client application program, the VPN client establishing a secure communications tunnel with the VPN gateway;
(d) rewriting, by a packet rewriter on the USB device, address information on the outbound packet; and
(e) transmitting, by the transmitter on the USB device, the rewritten outbound packet to the VPN client application program to route to the VPN gateway.

* * * * *